Figure 2:
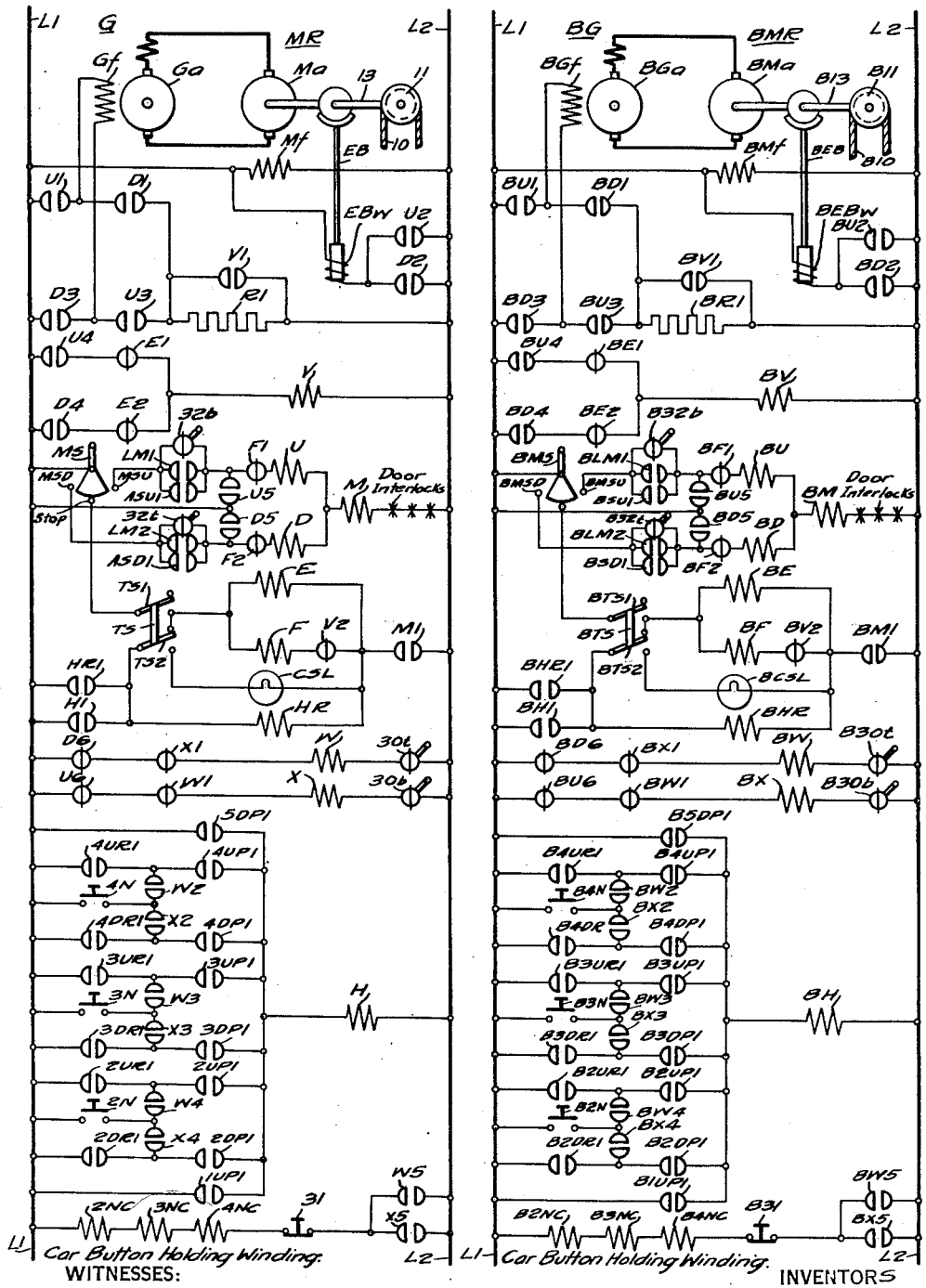

March 28, 1939.  H. W. WILLIAMS ET AL  2,151,819
ELEVATOR CONTROL SYSTEM
Filed Jan. 4, 1936  16 Sheets-Sheet 1
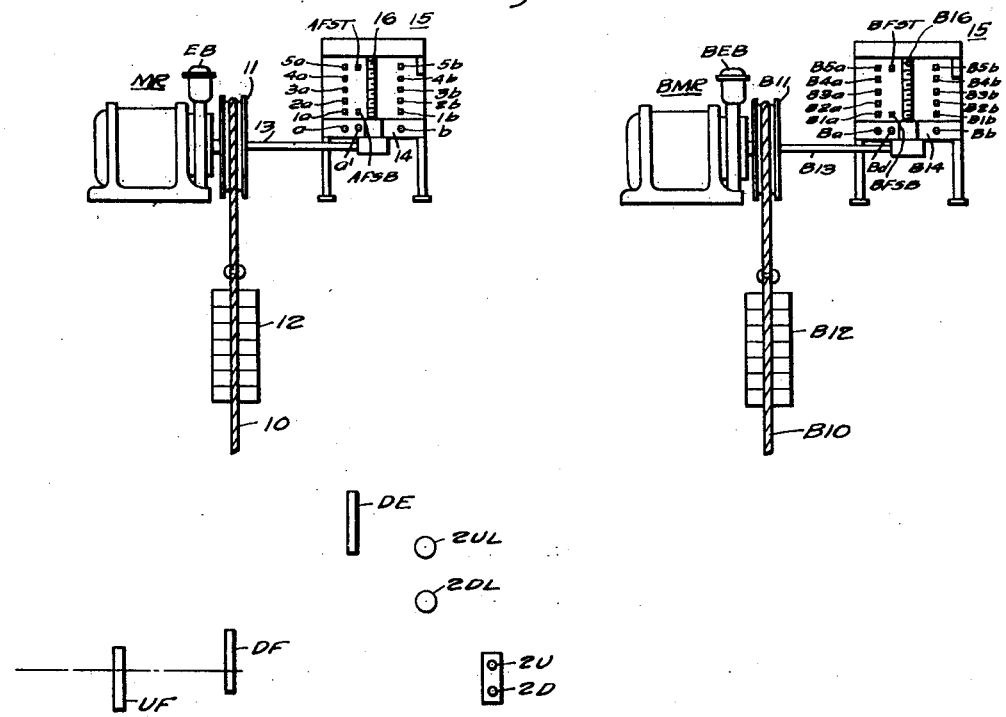
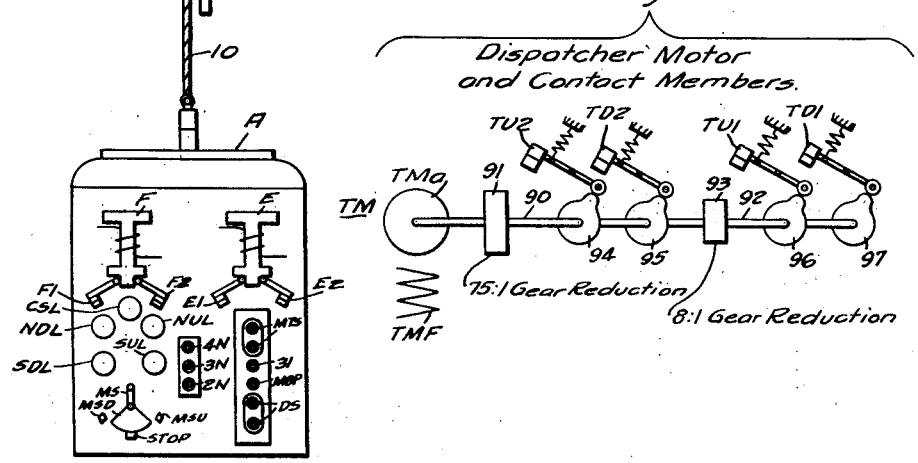
WITNESSES:
INVENTORS
Harold W. Williams
and Richard W. Jones
BY
ATTORNEY

Fig. 5A.

March 28, 1939. H. W. WILLIAMS ET AL 2,151,819
ELEVATOR CONTROL SYSTEM
Filed Jan. 4, 1936 16 Sheets-Sheet 12
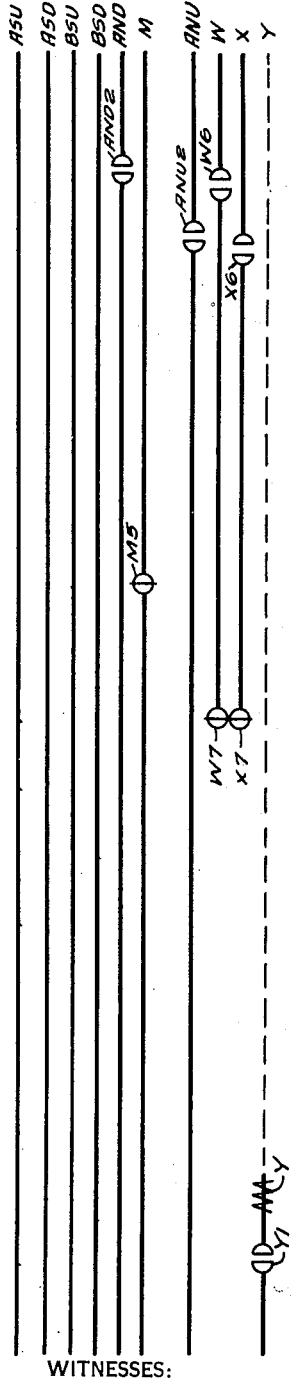
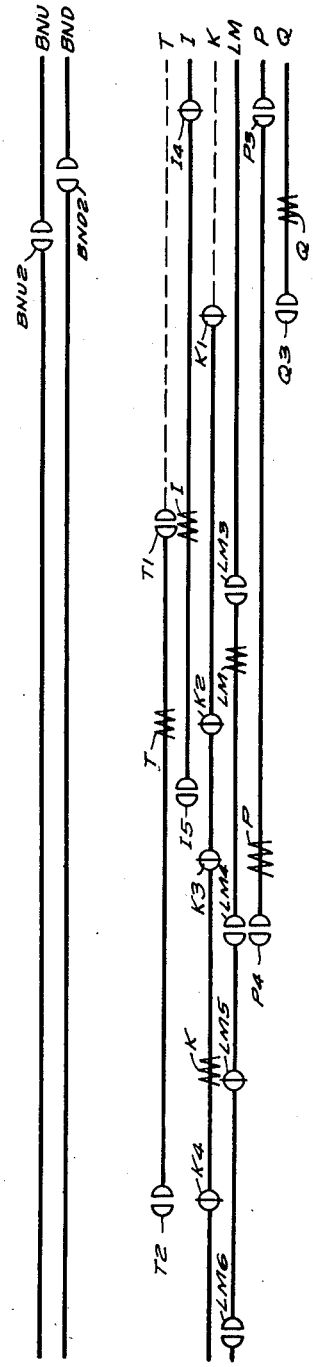
Fig. 6A.

March 28, 1939. H. W. WILLIAMS ET AL 2,151,819
ELEVATOR CONTROL SYSTEM
Filed Jan. 4, 1936 16 Sheets-Sheet 14

INVENTORS
Harold W. Williams
and Richard W. Jones.
BY 
ATTORNEY

March 28, 1939.   H. W. WILLIAMS ET AL   2,151,819
ELEVATOR CONTROL SYSTEM
Filed Jan. 4, 1936   16 Sheets-Sheet 16
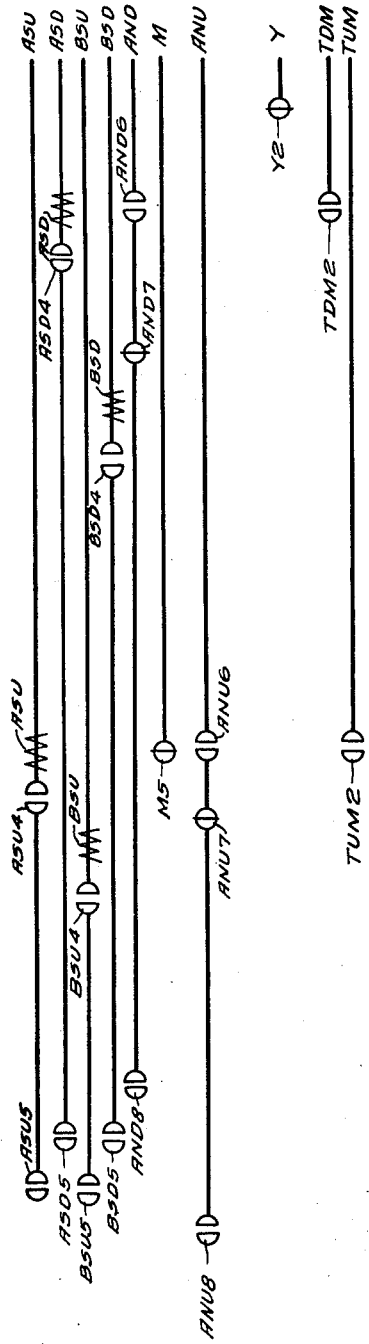
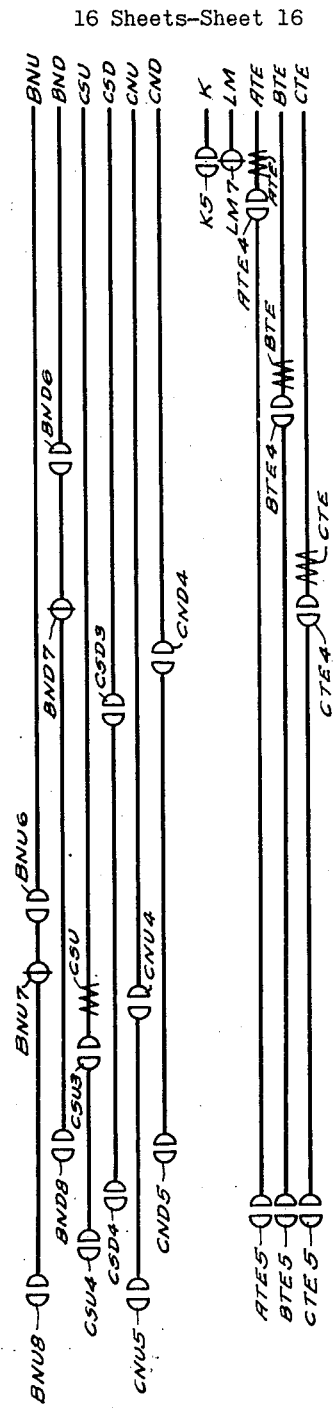
Fig. 8A.
WITNESSES:
INVENTORS
Harold W. Williams
and Richard W. Jones,
BY
ATTORNEY Patented Mar. 28, 1939

2,151,819

UNITED STATES PATENT OFFICE 2,151,819

ELEVATOR CONTROL SYSTEM

Harold W. Williams and Richard W. Jones, Chicago, Ill., assignors to Westinghouse Electric Elevator Company, Chicago, Ill., a corporation of Illinois Application January 4, 1936, Serial No. 57,558

25 Claims. (Cl. 187—29)

Our invention relates, generally, to electrical control systems, and it has particular relation to such systems as applied to a bank of elevator cars.

The object of our invention, generally stated, is to provide a combined elevator control and signalling system which shall be simple and efficient in operation and which may be readily and economically manufactured and installed.

An object of our invention is to provide for maintaining the cars of a bank of elevator cars operating on a predetermined schedule by preventing any hall calls registered after a next signal is given to a car from being assigned to the car receiving the next signal.

Another object of our invention is to improve the service provided by a bank of elevator cars by preventing any hall calls registered after a "next" signal is given to a car by a dispatcher from being effective to stop the car, and for assigning the call to the next car in the dispatcher sequence.

A further object of our invention is to assign a zone of floors to a car as soon as it receives a signal that it is the next car to leave a terminal.

Still another object of our invention is to permit the elevator cars of a bank of cars operating under the control of a dispatcher, to leave a terminal only on receipt of a start signal.

A still further object of our invention is to prevent an elevator car, operating under control of a dispatcher with other cars of a bank of cars, from accepting hall calls, and to remove it from the dispatcher sequence when the operator in the car operates a by-pass switch or places the car on maintenance operation.

Another object of our invention is to restore an eleavtor car of a bank of cars, operating under control of a dispatcher, that has been taken out of the dispatcher sequence to the dispatcher sequence by operating the car to a terminal.

A further object of our invention is to remove the signalling system of an elevator car of a bank of cars, operating under control of a dispatcher, from the dispatcher sequence on reversal of the direction of movement of the car between the top and bottom terminals.

Still a further object of our invention is to assign the zone of an elevator car removed from its position in a dispatcher sequence on its reversal between terminals to the next car in the sequence.

Another object of our invention is to provide for controlling the times when the cars of a bank of elevator cars leave a terminal by means of a dispatcher, and indicating the car which will respond to a hall call as soon as the call is registered.

Still another object of our invention is to provide a zone of floors for each car of a bank of cars operating under control of a dispatcher at which floors the car individual thereto will be stopped by registering hall calls and a signal will be given as soon as a call is registered indicating the car which will stop in response to the registration of a call.

Other objects of our invention will appear hereinafter.

Our invention, accordingly, is disposed in the embodiment hereof shown in the accompanying drawings, and comprises the features of construction, combination of elements and arrangement of parts, which will be exemplified in the construction hereinafter set forth and the scope of the application of which will be indicated in the appended claims.

For a more complete understanding of the nature and scope of our invention, reference may be had to the following detailed description, taken in connection with the accompanying drawings, in which:

Figure 1 illustrates diagrammatically the arrangement of one elevator car in a hatchway and part of the control apparatus for a second car;

Figs. 2, 3, 4, 5, 6, 7 and 8 illustrate diagrammatically the circuit connections which may be employed in practicing our invention. In order to more readily understand the circuits shown in these figures, they are so illustrated that they may be positioned one above the other, Fig. 2 at the top and Fig. 8 at the bottom, so that, in effect, the assembled diagram appears on a single long narrow sheet.

Figure 2A:
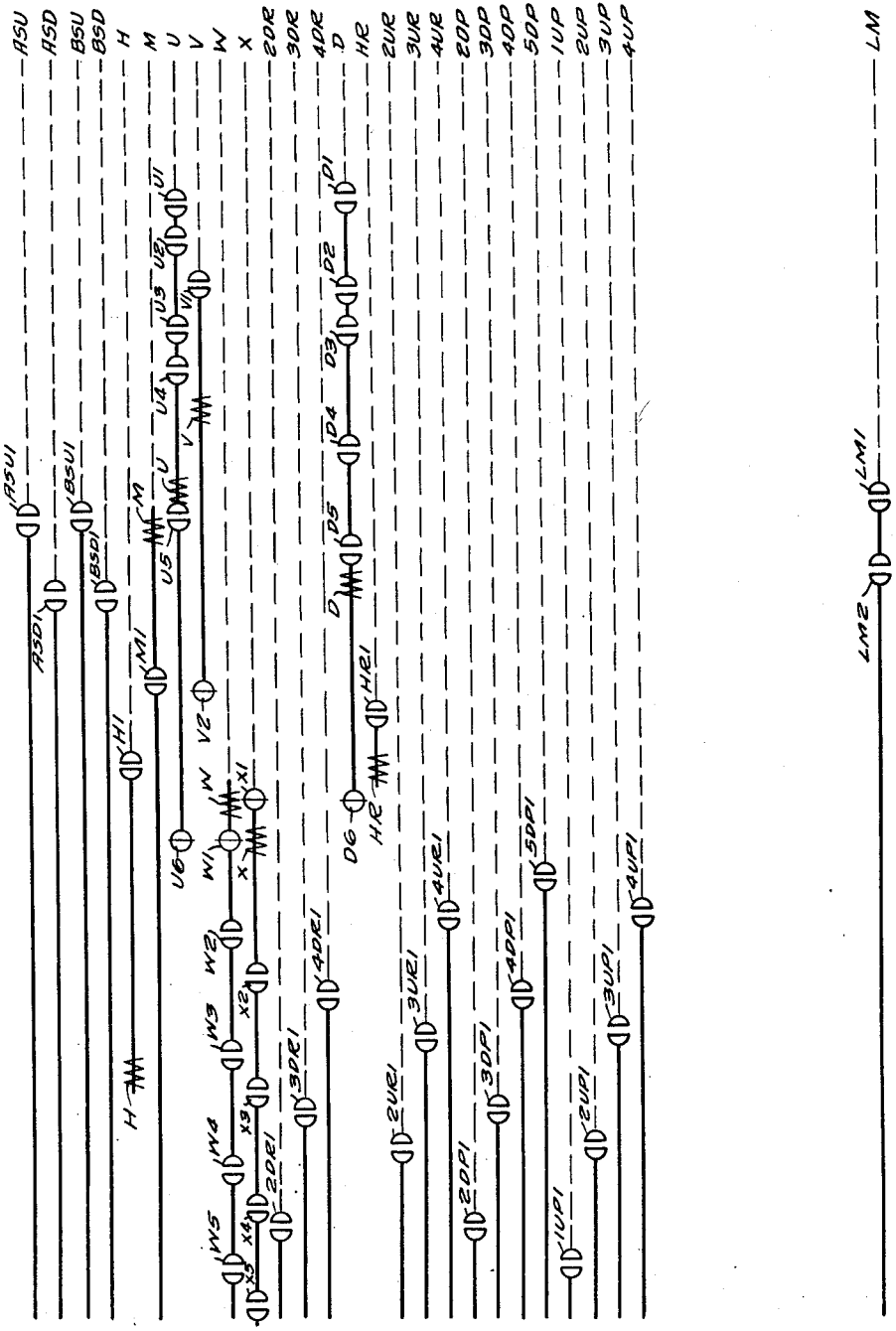
Figure 3:
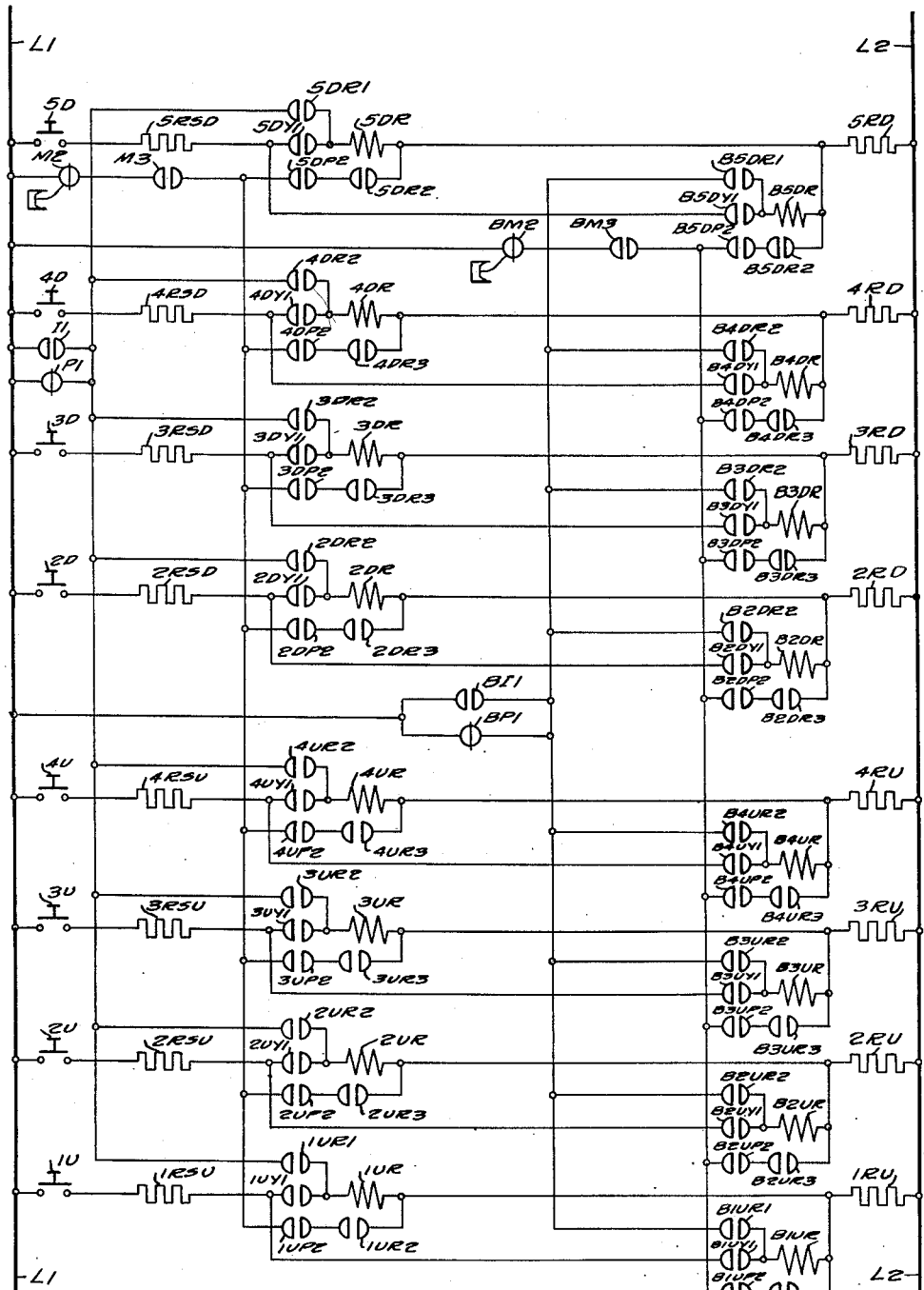
Figure 3A:
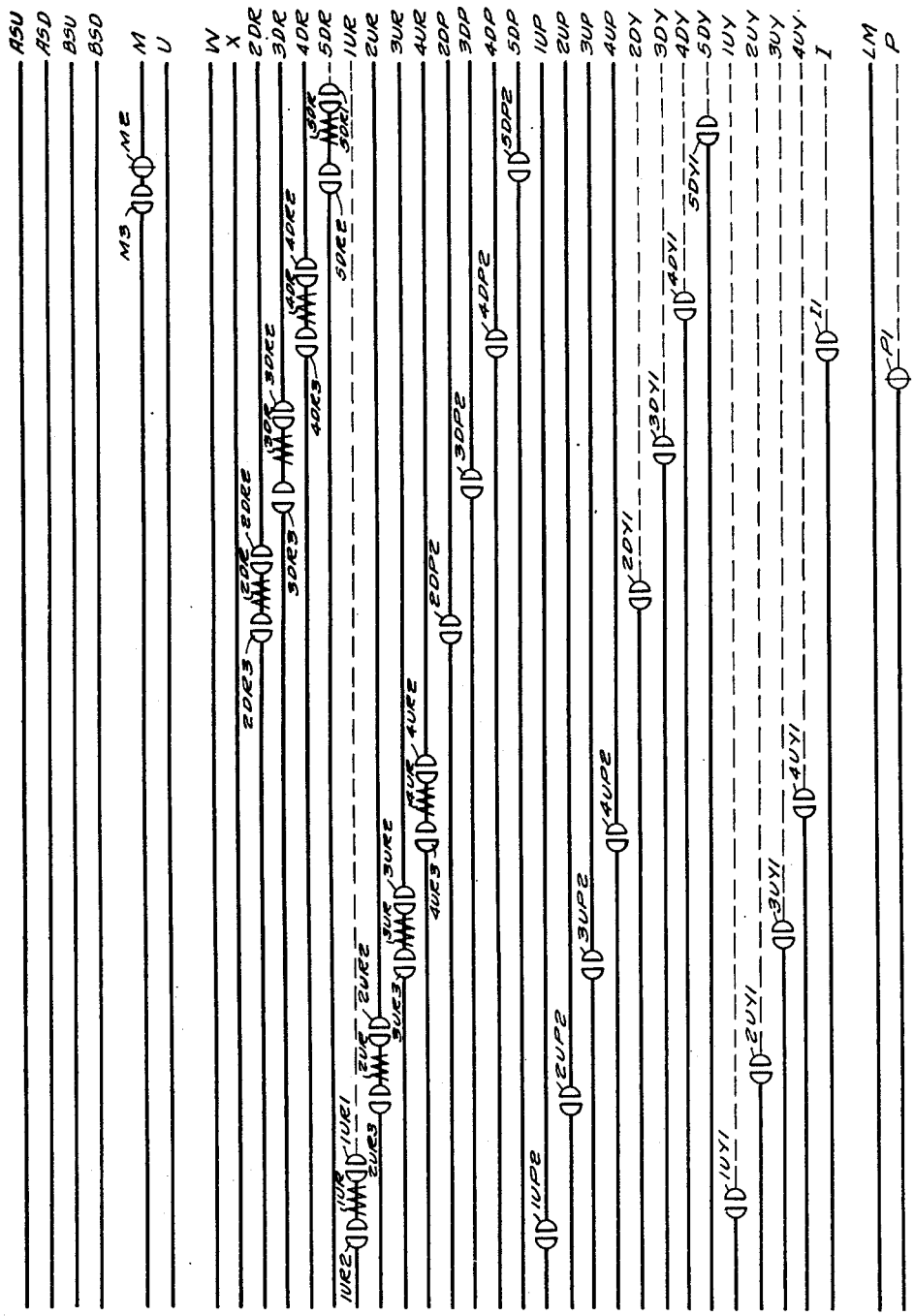
Figure 4:
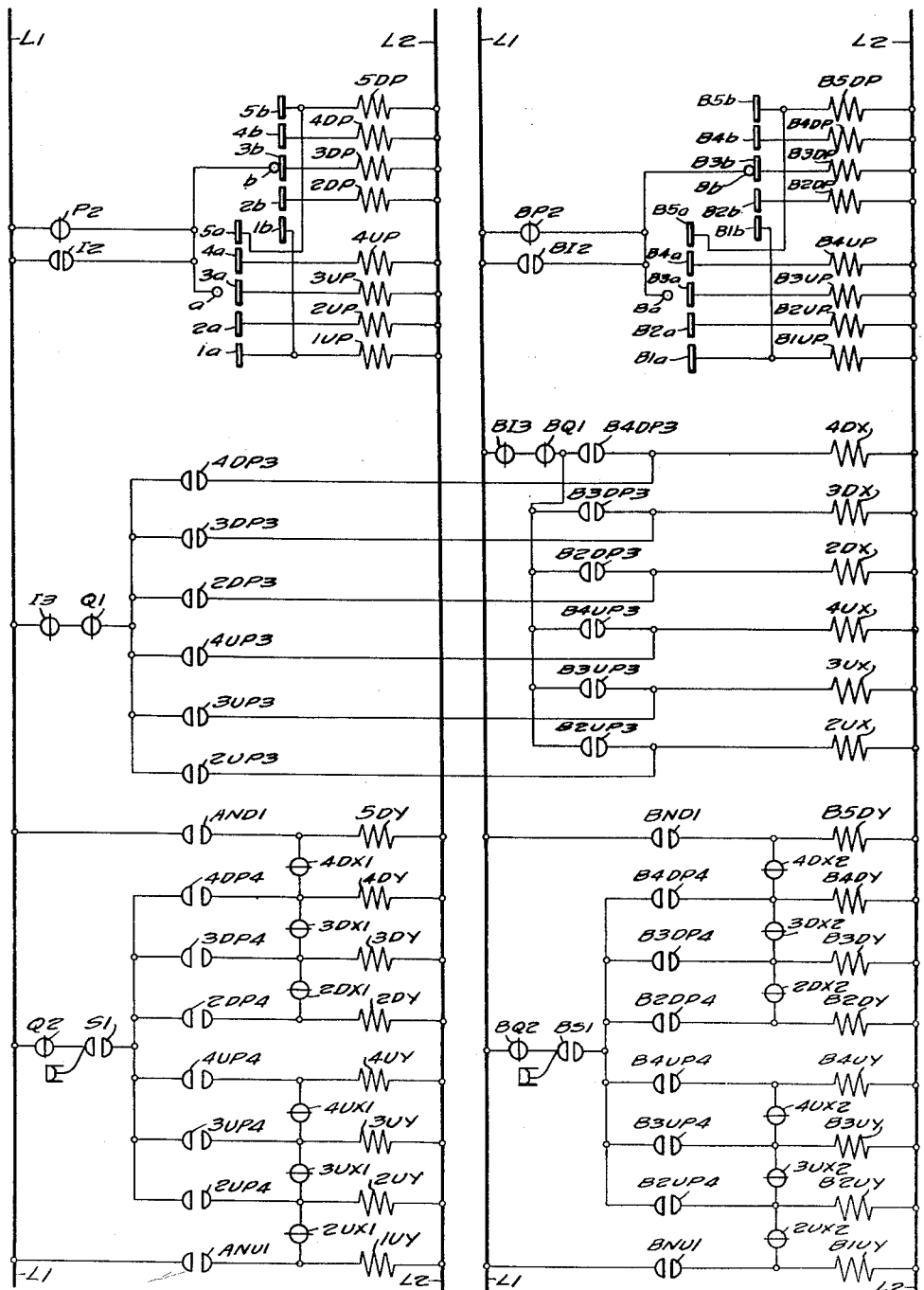
Figure 4A:
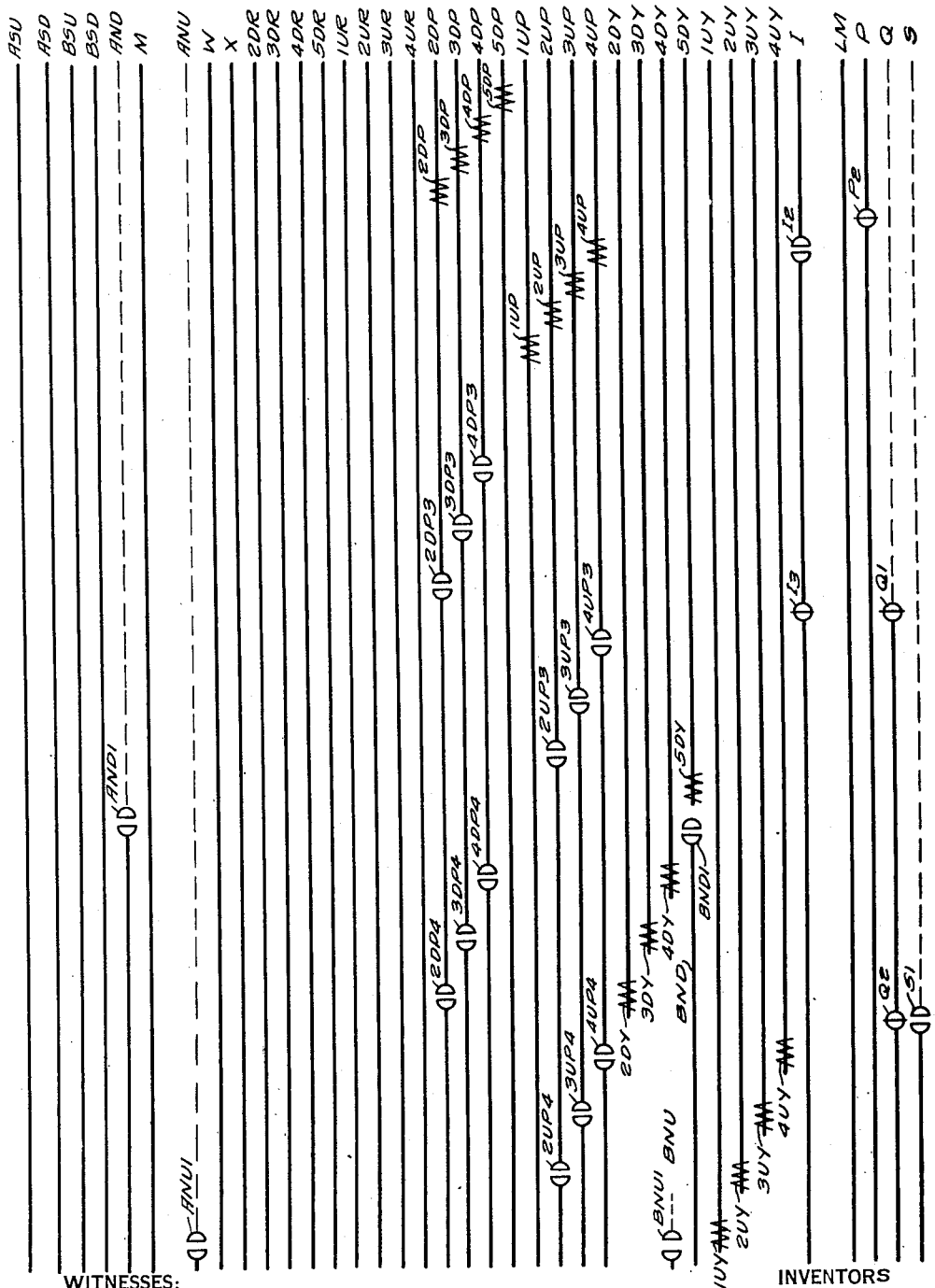
Figure 4A:
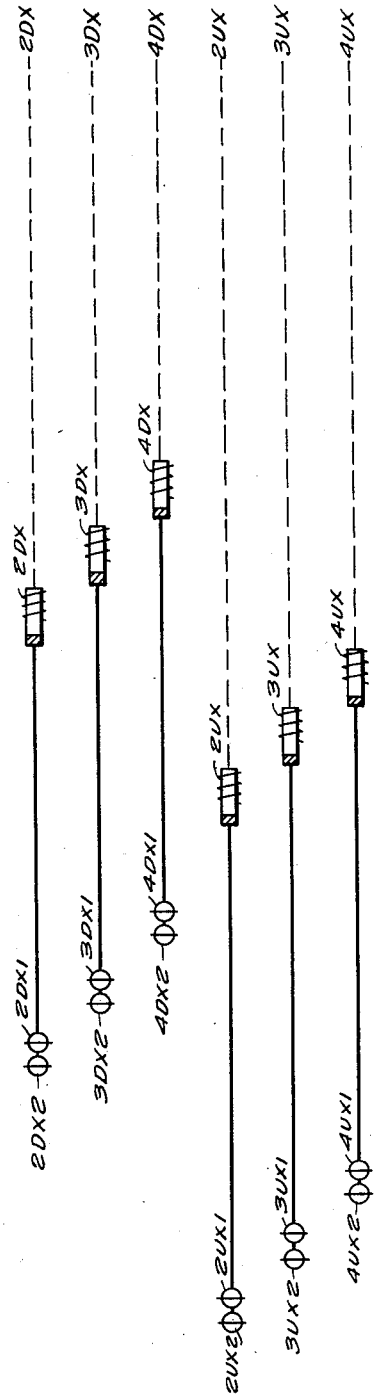

Figs. 2A, 3A, 4A, 4AA, 5A, 6A, 7A and 8A illustrate the arrangement of the contact members and operating windings of the switches and relays illustrated in the figures to which the reference numerals 2 through 8 have been employed. The Figs. 2A through 8A may be assembled alongside of the diagrams bearing the same figure numerals and by projection across the diagrams, the contact members and their operating windings may be located. Fig. 4AA should be positioned alongside of Fig. 4A. By positioning the Figs. 2A through 8A one above the other, the arrangement of the various contact members and operating windings will be more fully understood, since parts of each of the relays and switches are illustrated in several different figures; and Fig. 9 illustrates diagrammatically the arrangement of the dispatcher motor and the contacts driven thereby.

In order to reduce circuit complications to a minimum, only the control systems for two elevator cars A and B are described herein, although it will be understood that the invention is intended for use in conjunction with a bank of elevator cars, including a larger number, for example, six cars. In like manner, the dispatcher has been illustrated as being adaptable for an elevator bank comprising three cars, A, B and C, it being understood, however, that it may be expanded by a duplication of apparatus for a larger number of cars as, for example, six cars.

In order to reduce the apparatus shown to a minimum, the invention has been illustrated as being applicable to a bank of cars operating between first and fifth floor terminals. It will be obvious, however, that the system may be extended to include as many floors as desired.

Wherever possible, the apparatus which is individual to car B has been given the same reference character as the corresponding piece of apparatus of car A, with the exception that the prefix B is used to indicate that the apparatus is individual to car B. Since the functioning of car A will be described in detail, the prefix A has been omitted from the reference characters pertinent thereto, in order to reduce the number of characters making up each reference character used in the description.

General description

We have illustrated our invention in conjunction with a Ward-Leonard variable voltage control system for controlling the movement of an elevator car in a shaft past a plurality of floors and between top and bottom terminals. The system may be operated under control of an operator in the car who is provided with a master switch which may be operated in either an up or a down direction, depending upon the direction of movement of the car which is desired. In response to the operation of the master control switch, the Ward-Leonard control system is caused to function to automatically accelerate the car to full speed.

It is desirable to prevent an operator from leaving a terminal until the start signal is given by a dispatcher system which is provided for operating the cars according to a predetermined schedule, so that the system may be efficiently utilized and adequate service provided for the various floors. For this purpose, an interlocking circuit is provided under the control of the dispatcher which prevents the master switch in the elevator car from being effective to initiate the movement of the elevator car from either terminal until the start signal is given that the time has arrived when the car should leave the terminal. As long as the elevator car remains connected to be operated in the dispatcher sequence, it will not be possible for the operator to cause the car to leave a terminal until the start signal individual thereto is given. However, if the elevator car is taken out of the dispatcher sequence in response to its being transferred for some reason, to what may be termed "maintenance operation" then the dispatcher is no longer effective to prevent the car leaving a terminal. The term "maintenance operation" signifies the functioning of the elevator car which is not controlled in accordance with the dispatcher, such as the condition which exists when it is desired to operate the car solely to make adjustments on it, at which time it is not intended to be in service for carrying passengers between floors.

Car direction relays are provided which are operable in accordance with the direction in which the car operates to condition circuits for operation in accordance with the direction of movement of the car. These relays are also effective in the event that a car is reversed in a shaft between the terminals for initiating a sequence of operations which will remove the car from the dispatcher sequence until it arrives at a terminal, at which time it is automatically restored to the dispatcher sequence.

The elevator cars are arranged to be stopped either in response to the registration of a hall call, or in response to the registration of a car call by the operator. In either case, a stopping relay is energized which, in turn, effects the energization of a slow-down inductor switch operated by an inductor plate positioned in the hatchway. In response to the operation of the slow-down inductor switch, the speed of the elevator car is decreased to landing speed and on approaching the floor at which the call is registered, a stopping inductor switch is effective to stop the elevator car at the floor level.

At each intermediate floor between the top and bottom terminals, two hall call buttons are provided, one for each direction of travel. By means of these buttons, it is possible for a passenger to register a call for either direction of travel. In response to the operation of a hall call button, a call storing relay is operated. The call storing relay which is operated depends upon the car to which the registered call is assigned. Each car is provided with a zone of floors at which floors calls may be registered that will be effective to stop the car individual thereto. Depending upon the car to which the particular zone is assigned, the hall call button will be effective to operate the call storing relay at the floor where the call is registered individual to that particular car.

As soon as a call storing relay is operated, it is not possible to operate another call storing relay at the same floor for the same direction of travel. This selective functioning is effected by the provision of a resistor in series circuit relation with all of the operating windings of the call storing relays certain of which may be connected in parallel circuit relation under certain conditions. However, when the operating winding of one of the call storing relays is energized through the resistor, sufficient operating voltage does not remain due to the drop in voltage caused by the current already flowing through the resistor to permit the energization of the operating winding of an additional call storing relay at the same floor in parallel with the one already energized.

As soon as a particular call storing relay is operated at a floor in response to the operation of a hall call button at the floor, the hall lantern individual to the car which will stop at the floor is instantly lighted. The person registering the call may, therefore, place himself at once in front of the hatchway entrance individual to the hall lantern which is lighted so that he will be ready to enter the car as soon as it arrives at the floor and the hatchway doors are opened.

In order to cancel a call after it has been answered, a circuit is provided for shunting down the energized operating winding of the call storing relay on which the call has been registered. This is accomplished by momentarily completing the shunt circuit in response to the operation of the controls for starting the car away from the floor.

The position of the elevator car at and between terminals is effective to operate a series of car position relays. The operating windings of the car position relays are connected to floor segments corresponding to the various floors and on movement of the car in the hatchway, a brush is caused to successively engage the different segments to energize different car position relays, depending upon the position of the elevator car. The operation of the car position relays is effective to control the operation of a series of zoning relays which are common to all of the cars in the bank. By means of zoning relays a zone of floors is assigned to each car, so that it will be responsive only to calls registered at floors which are included in the zone individual thereto.

As a result of the combined functioning of the car position relays of a car and the zoning relays common to all of the cars, car selecting relays are operated which control the functioning of the call storing relays previously described. The call storing relay at a floor which will be operated will depend upon the position of the car individual thereto and the zone of floors which is assigned to it. In certain instances, it may occur in the functioning of a bank of elevator cars that two cars will be present at the same floor on trips in the same direction at approximately the same time. In such a case, it is desirable to select one of the cars to which the zone immediately preceding both of them may be assigned, so that there may be a definite assignment of the zone. For this purpose, a selective relay individual to each car is provided, which is operable in response to the successive operations of the car position relays. That is, as the car position relays are successively operated, the selective relay individual to each car is successively energized and deenergized. Individual to each floor, a resistor is provided through which the selective relays of the various cars are energized. Thus, the first car arriving at a floor has its selective relay energized. The next car arriving at the floor will not have its selective relay energized, due to the fact that the operating voltage available for energizing the operating windings of its selective relay is not sufficient to operate it, caused by the voltage drop through the resistor as a result of the current already flowing to energize the operating winding of the selective relay individual to the first car which arrived at the floor. The second car arriving at the floor, therefore, has no zone assigned to it as long as both of the cars remain at the floor, and the zone immediately ahead of both cars is assigned to the first car which arrived at the floor. Consequently, calls registered in that zone will be assigned to the first car which arrived at the floor. As the cars leave the floor, a zone is automatically assigned to each car, which will depend upon their relative positions in the hatchways, and their relative positions with respect to the remaining cars of the bank.

As set forth hereinbefore, each car is provided with a hall lantern which, for the intermediate floors, is individual to each direction of movement of the cars. The hall lanterns indicate which car is to answer the registered hall calls and a lantern will be illuminated as soon as a call is registered.

Circuits are provided for lighting the hall lanterns at the intermediate floors when the cars individual thereto stop at the floors in response to the operation of calls registered by the operator in the car. The hall lantern will be lighted in this instance only after the car has stopped at the floors. This will indicate the direction in which the car is moving so that passengers at the floor desiring to travel in the direction in which the car is moving may enter it without registering a call to stop another car at the floor. In the event that a call is registered, for a particular car in a direction opposite to in which it is travelling, and the corresponding hall lantern is lighted, then by the provision of an interlocking circuit, this hall lantern will be extinguished in the event that the hall lantern for the opposite direction is lighted in response to the car stopping at the floor on operation of a car call button. As soon as the car leaves the floor, the hall lantern will again be illuminated to indicate that the same car will stop at the floor in the opposite direction of travel to answer the registered call.

In order to speed up the service of the system, it is desirable to have the elevator cars leave the terminals as soon as they receive a signal that the car is to start. The start signals are provided by a dispatcher which is set to give the start signals at spaced intervals that have been found from experience, will dispatch the elevator cars to the best advantage. According to our system, we have provided for indicating to an operator when his car is the next car that is to leave a terminal in the dispatcher sequence. The next signal may be given to the car while it is still travelling toward a terminal. In such case, it is desirable that the car arrive at the terminal with a minimum of delay, since no other car can leave the terminal until it has arrived and departed. Therefore, we have provided an automatic by-passing relay which will be operated as soon as a next signal is given to a car and which, in turn, is effective to prevent the car individual thereto from responding to any other hall calls which would be otherwise effective to stop it before it arrived at the next terminal. In addition, its zone, insofar as floors between it and the terminal are concerned, is assigned to the car nearest it in the hatchway and it is, therefore, free to proceed to the terminal and need only stop in response to hall calls which are already registered and to car calls registered by the operator.

In the event that the car is filled and cannot receive any additional passengers, it is desirable to by-pass calls which are registered for the car, or which might otherwise be registered for it, and to permit the car to operate to the next terminal without stopping at intermediate floors. For this purpose, a manual by-pass switch is provided in the car which is effective to operate the previously described by-pass relay. The car immediately loses its zone and calls previously registered for it are transferred to the car which assumes the zone of the car in which the by-pass switch has been operated.

Under certain conditions, the car may reverse in the shaft. Ordinarily, such operation will not take place, but in some instances the operator will find it necessary to reverse the car. In the event of such occurrence, the car will be considerably delayed in arriving at the next terminal and, therefore, it is desirable to remove it from the dispatching sequence. At the time that the car is reversed in the hatchway, its direction relays will both be momentarily deenergized, and as a result, a circuit will be completed for operating a car reversal relay which is effective to initiate a sequence similar to that initiated when the automatic by-pass relay is operated.

If the by-pass relay is operated in response to the reversal of the car in the hatchway the car loses its place in the dispatcher sequence. However, as soon as it arrives at a terminal it is automatically restored to the dispatcher sequence.

When it is desired to make adjustments or effect various repairs on an elevator car, it is desirable to remove it from control of the dispatcher and to prevent it from being stopped in response to registered hall calls. For this type of operation a maintenance switch is provided in the elevator car which may be operated by the operator and when operated, the automatic by-pass relay is energized and is maintained in the energized condition until the maintenance switch is restored to the non-operated position. The car on arriving at a terminal, is not restored to the dispatcher sequence. Furthermore, it will not be stopped in response to the operation of hall calls, nor will any of its hall lanterns be lighted in response to it stopping at the various floors in response to the registration of car calls.

The dispatcher is operated by means of a timer motor which is arranged to operate contact members individual to the top and bottom terminals at a comparatively slow rate of speed to provide the desired start signals. Additional contact members are provided which are operated by the timer motor at a higher rate of speed to step the dispatcher system rapidly past the various positions of the cars, which may have been removed from the dispatcher sequence to the next car which is arranged to be controlled by the dispatcher.

The timer contact members which are periodically operated to provide the start up and start down signals may be termed up and down impulse timer contact members, while the contact members which operate rapidly to step the dispatcher from one position to another, may be termed up and down chain driving timer contact members. Up and down relay chains are provided, which are operated by the chain driving contact members to give the next signals to the various cars, and to condition circuits for subsequently providing the start signals on the operation of the impulse timer contact members. In the event that the signal system of one or more of the cars is removed from the dispatcher sequence for any reason, the chain driving contact members are effective to rapidly step the relay chains from one position to another until they reach the position of the next car in the sequence.

The dispatcher system is also effective to assign a zone of floors to the car which is next to leave a terminal. As soon as the next signal is given to a car, a zone of floors is also assigned to the car, which includes all of the floors up to the next car in the hatchway. As set forth hereinbefore, on the giving of a next signal to a car which is not at a terminal, its by-pass relay is operated by the dispatcher to prevent it from being responsive to any other calls later registered which would otherwise be effective to stop it.

In the event that a car which should receive a start signal is not at the terminal, a single storing relay is provided which will hold the signal until the car for which it is intended arrives at the terminal and leaves it. This is effected by stopping further operation of the dispatcher until the car to which a start signal has been given leaves the terminal in response thereto. By this means, it is possible to keep the cars more uniformly spaced in the sequence and to provide more uniform service at the various floors.

Each car is provided with dispatcher signal lights individual to each direction of travel, and to each signal. Thus, each car is provided with a next down and a start down light, and a next up and a start up light.

The floor selector of each car is provided with segments which are arranged to be engaged by a brush carried by the brush carriage of the floor selector to condition circuits for energizing the start up and start down relays individual to the various cars. As set forth hereinbefore, on the giving of a start signal to a car, a control circuit is completed which will permit the operator to start the car from the terminal. Thus, in response to the operation of the start up or start down relay of a car, a circuit is completed which will permit the operator, on operation of the master switch, to initiate the movement of the car from the terminal.

Instead of employing the call registering relays to set up circuits for stopping the cars at the various floors in response to hall calls, they may be employed to signal to the operator when he is to stop at a floor by lighting a car signal light in the car. The operator can then move the master switch to stop the car in response to the signal which he has received.

Circuit symbols

In order to provide for more readily understanding the following description and the circuits shown in the accompanying drawings, a schedule of apparatus follows. This schedule indicates the apparatus which is individual to car A, the apparatus which is common to all of the cars, and the apparatus which is included in the dispatcher. Since the apparatus individual to car B, for the most part, is a duplicate of that provided for car A, it is not listed in the schedule, but is illustrated in the drawings with the same reference character and using the prefix B to indicate that the apparatus is individual to car B.

Control apparatus individual to car A

| | |
|---|---|
| U | Up reversing switch. |
| D | Down reversing switch. |
| M | Auxiliary control relay. |
| V | Speed switch. |
| W | Up direction relay. |
| X | Down direction relay. |
| E | Slowdown inductor switch. |
| F | Stopping inductor switch. |
| HR | Holding relay. |
| H | Stopping relay. |
| MS | Master switch on car. |
| MSU | Up master switch contact member. |
| MSD | Down master switch contact member. |
| 2N | |
| 3N | Car buttons. |
| 4N | |
| 2NC | |
| 3NC | Car button holding windings. |
| 4NC | |
| 30$t$ | Top limit switch to reset car buttons. |
| 30$b$ | Bottom limit switch to reset car buttons. |
| 31 | Manual reset switch on car to reset car buttons. |
| Q | Automatic by-pass relay. |
| I | By-pass relay. |
| P | Auxiliary by-pass relay. |
| T | Car reversal relay. |
| LM | Maintenance relay. |
| K | Releasing relay. |

MTS   Manual maintenance switch on car.
MBP   Manual by-pass switch on car.
CSL   Car signal light on car.
40t   Top limit switch for releasing relay K.
40b   Bottom limit switch for releasing relay K.
DS    Dispatcher start switch on car.
Y     Dispatcher disconnecting relay.
1UR  ⎫
2UR  ⎪
3UR  ⎬ Up call storing relays.
4UR  ⎭
2DR  ⎫
3DR  ⎪
4DR  ⎬ Down call storing relays.
5DR  ⎭
1UP  ⎫
2UP  ⎪
3UP  ⎬ Up car position relays.
4UP  ⎭
2DP  ⎫
3DP  ⎪
4DP  ⎬ Down car position relays.
5DP  ⎭
1UY  ⎫
2UY  ⎪
3UY  ⎬ Up car selecting relays.
4UY  ⎭
2DY  ⎫
3DY  ⎪
4DY  ⎬ Down car selecting relays.
5DY  ⎭
S     Car selectivity relay.
1UL  ⎫
2UL  ⎪
3UL  ⎬ Up hall lanterns.
4UL  ⎭
2DL  ⎫
3DL  ⎪
4DL  ⎬ Down hall lanterns.
5DL  ⎭

*Control apparatus, except dispatcher, common to all cars*

1U   ⎫
2U   ⎪
3U   ⎬ Up hall call buttons.
4U   ⎭
2D   ⎫
3D   ⎪
4D   ⎬ Down hall call buttons.
5D   ⎭
2UX  ⎫
3UX  ⎬ Up zoning relays.
4UX  ⎭
2DX  ⎫
3DX  ⎬ Down zoning relays.
4DX  ⎭

*Dispatcher control and signalling apparatus*

TN    Dispatcher starting relay.
TM    Timer motor.
TU1   Up impulse timer contact members.
TD1   Down impulse timer contact members.
TU2   Up chain driving timer contact members.
TD2   Down chain driving timer contact members.
TUM   Up start signal storing relay.
TDM   Down start signal storing relay.
TUJ  ⎫
TUK  ⎬ Up chain driving relays.
TDJ  ⎫
TDK  ⎬ Down chain driving relays.
NU    Auxiliary next up relay.
ANU   Auxiliary next up relay car A ⎫
BNU   Auxiliary next up relay car B ⎬ up chain.
CNU   Auxiliary next up relay car C ⎭
ND    Auxiliary next down relay.
AND   Auxiliary next down relay car A ⎫
BND   Auxiliary next down relay car B ⎬ down chain.
CND   Auxiliary next down relay car C ⎭
TUR   Motor starting relay.
TDR   Auxiliary relay.
TUP   Auxiliary time delay relay (up).
TDP   Auxiliary time delay relay (down).
TUH   Motor stopping relay (up).
TDH   Motor stopping relay (down).
ATE   Dispatcher control relay car A.
BTE   Dispatcher control relay car B.
CTE   Dispatcher control relay car C.
ASU   Start up relay car A.
BSU   Start up relay car B.
CSU   Start up relay car C.
ASD   Start down relay car A.
BSD   Start down relay car B.
CSD   Start down relay car C.
NUL   Next up light car A.
BNUL  Next up light car B.
CNUL  Next up light car C.
NDL   Next down light car A.
BNDL  Next down light car B.
CNDL  Next down light car C.
SUL   Start up light car A.
BSUL  Start up light car B.
CSUL  Start up light car C.
SDL   Start down light car A.
BSDL  Start down light car B.
CSDL  Start down light car C.

*Apparatus shown in Fig. 1 of the drawings*

Referring now particularly to Fig. 1 of the drawings, it will be observed that car A is arranged to be supported in a hatchway by means of a cable 10 which is passed over a sheave 11 and is counterweighted by means of counterweights 12. The sheave 11 is mounted for rotation with a shaft 13 which is driven by a motor MR. A brake EB is provided for stopping further rotation of the sheeve 11 when the motor M is deenergized.

As illustrated, the shaft 13 is extended and is arranged to operate a brush carriage 14 of a floor selector shown generally at 15, by rotating a lead screw 16. The brush carriage 14 is provided with brushes a, b and a'. The brush a is arranged to successively engage segments 1a, 2a, 3a, 4a, 5a, as the car A is moved upwardly in the hatchway. On reversal of the rotation of the lead screw 16, brush b is arranged to successively engage segments 5b, 4b, 3b, 2b, 1b. At the top and bottom terminals brush a' is arranged to engage floor selector segments AFST and AFSB. For the purposes of illustration, the brushes a, a' and b are shown out of contact engagement with any of the floor segments. It will be understood, however, that brush a or brush b will be in engagement with their corresponding segments depending upon the direction of movement of car A, and that brush a' will be in engagement with segment AFST or AFSB, depending upon the terminal at which car A may be located.

In order to stop car A at a floor a slowdown inductor switch E is provided having contact members E1 and E2. These contact members are arranged to be opened on energization of the operating winding of the slowdown inductor switch E when they come into proximity respectively with inductor plate UE, the car moving in the up direction, or inductor plate DE, the car moving in the down direction. The car is stopped at a floor by means of a stopping inductor switch F which is provided with contact members F1 and F2. These contact members are operated depending upon the direction of movement of the car by inductor plates UF and DF, respectively, on energization of the operating winding of the inductor switch F. It will be understood that the slowdown inductor switch E and the stopping inductor switch F are carried by the car A while the inductor plates UE, DE, UF and DF are located in the hatchway, a set being individual to each floor.

Each car is also provided with a car signal light CSL which may be used in an alternative circuit arrangement to indicate that the car should be stopped at a floor by the operator in response to a registered hall call.

At each floor hall lanterns are provided to indicate which car will answer a call. As illustrated in Fig. 1 of the drawings, hall lanterns 2UL and 2DL are illustrated as being individual to the second floor. It will be understood that similar hall lanterns are provided for other floors. It will also be understood that a hall lantern is provided individual to each car and to each direction of travel.

In order to provide for registering calls at the floors, hall call buttons are provided at each floor, one for each direction of travel. As illustrated, the second floor is provided with an up hall call button 2U and a down hall call button 2D. The other floors are similarly provided with hall call buttons.

With a view to permitting the operator to stop car A at various intermediate floors, car call buttons 2N, 3N and 4N are provided. Operating windings are provided as will be set forth hereinafter, for maintaining the car buttons in the operated condition until a terminal is reached, or until the operator operates a manual reset switch 31 located in the switch panel in the car, as illustrated. The car may be started either from a terminal or from an intermediate floor by means of a master switch MS having two positions, the first in engagement with up contact member MSU for operating car A in the up direction, and the second in engagement with down contact member MSD for operating car A in the down direction. If the operator wishes to place car A on maintenance operation, or wishes to by-pass calls, he may operate, respectively, the maintenance switch MTS or the manual by-pass switch MBP also illustrated as a part of the control panel. When the operator wishes to initially place the car under the control of the dispatcher, he may operate the dispatcher control switch DS. Dispatching lights are also provided in the elevator car which indicate to the operator when his car is next to leave a terminal and when it is to leave a terminal. For this purpose, next up light NUL and start up light SUL are provided for operation away from the bottom terminal, and next down light NDL and start down light SDL are provided for operation away from the top terminal.

*Apparatus shown in Fig. 2 of the drawings*

Referring now particularly to Fig. 2 of the drawings, it will be observed that on the left-hand side, control circuits are shown which are individual to car A. At the right-hand side, the circuits shown are individual to car B. Since the circuits are substantially duplicates, reference only will be made to the circuits individual to car A.

As shown, the motor MR is provided with an armature Ma which is connected to the shaft 13 for driving the sheave 11. The brake EB is provided with a winding EBw which is energized on energization of the motor MR. A main field winding Mf is provided for the motor, which is connected for energization between control conductors L1 and L2. The armature Ma of motor MR may be energized by means of a generator G which is provided with an armature Ga connected in loop circuit with the armature Ma. In order to control the direction and value of the voltage generated by the armature Ga, a main field winding Gf of the generator is provided.

The master switch MS, previously described as being positioned on the car for the operator, is here shown for selectively controlling the energization of the operating windings of an up reversing switch U and a down reversing switch D and in the centered position for stopping the car under certain operating conditions. The reversing switches U and D are provided with contact members, as illustrated, for reversing the connections of the generator field winding Gf to the conductors L1 and L2, depending upon the direction in which it is desired to operate the elevator car. When either the up or the down reversing switch U or D is energized, an auxiliary control relay M is also energized to perform functions which will be set forth hereinafter. In order to apply the maximum voltage to the main field winding Gf, a speed relay V is provided, which is energized on energization of either the up or the down reversing switch U or D to short circuit a resistor R1, which is otherwise connected in series circuit relation with the generator field winding Gf.

In the event that it is desired to permit the operator to entirely control the stopping of the car at the various floors, a transfer switch TS may be provided. This switch, in the position shown, is adapted to complete certain circuits for automatically stopping the car in response to registered hall calls and, in the alternate position, it is adapted to prepare a circuit for energizing the car signal light CSL and for connecting the master switch MS to be effective in the centered position to stop the car when the car signal light is lighted.

For the purpose of performing certain functions which depend upon the direction of movement of the elevator car, up and down direction relays W and X, respectively, are provided. The operating windings of these relays are controlled, in part, by a limit switch 30t, individual to the top terminal, and a limit switch 30b, individual to the bottom terminal. These switches are arranged to be opened when the car is at the corresponding terminal, thereby preventing the energization of one or the other direction relay depending upon the terminal at which the car may be.

As set forth hereinbefore, each car is provided with a slowdown inductor switch E and a stopping inductor switch F, the operating windings of which are arranged to be energized on operation of a stopping relay H and a holding relay HR. The stopping relay H is arranged to be operated either in response to the operation of the car buttons 2N, 3N, 4N, or in response to the registration of a hall call, as will be set forth hereinafter. Since the stopping relay H is operated only momentarily, the holding relay HR is provided for maintaining the energizing circuit for the operating windings of the slowdown and stopping inductor switches E and F.

It is desirable to provide for maintaining the car buttons 2N, 3N, 4N in the operated condition, and for this purpose, holding windings 2NC, 3NC, 4NC are provided individual to each of these car buttons. On operation of any of the car buttons, they will be held in the operated condition until they are deenergized either by the operation of the reset button 31 in the car, or by the operation of the direction relays W or X, both being momentarily deenergized at each terminal.

At intermediate floors the stopping relay H is controlled in response either to registered hall calls or registered car calls. As the car approaches either the bottom or the top terminal, it is desirable to have the stopping relay H energized for automatically stopping the car at the corresponding terminal. For this purpose, car position relays, which will be later described, and which are illustrated in Fig. 4, are effective to also complete circuits for energizing the operating winding of the stopping relay H.

In order to insure that the operator does not leave ahead of schedule, limit switches 32b and 32t are provided at the bottom and top terminals, respectively, for opening the energizing circuit to the operating windings of the up and down reversing switches U and D, respectively. There fore, even though the operator moves the master switch to engage contact members MSU or MSD, a control circuit will not be completed until these limit switches are bridged. The dispatcher, described hereinafter, and shown in Figs. 7 and 8 of the drawings, is arranged to bridge the contact members of these limit switches when the start signal is given by means of contact members ASU1 and ASD1, so that the operation of the master switch MS will be effective to energize either the up or the down reversing switch, depending upon the direction in which it is desired to travel.

In the event that the car is placed on maintenance operation, it is taken from control of the dispatcher and, therefore, it is desirable that the contact members of the limit switches 32b and 32t be bridged at all times during this operation. For this purpose, contact members LM1 and LM2 are provided which effect this bridging action as long as the car is conditioned for maintenance operation.

*Apparatus shown in Fig. 3 of the drawings*

Referring now particularly to Fig. 3 of the drawings, it will be observed that up hall call buttons 1U, 2U, 3U, 4U and down hall call buttons 2D, 3D, 4D, 5D are provided for the corresponding floors. It will be recalled that the hall call buttons are common to all of the cars and that at each floor, therefore, only one button for each direction of travel is provided.

In response to the operation of a hall call button, a call storing relay is operated, which depends upon the zone in which the particular floor is located. Thus, for calls in the up direction, call storing relays 1UR, 2UR, 3UR, 4UR are provided for car A, while car B is provided with similar call storing relays, for which the same reference character is employed with the prefix B. For the down direction, down call storing relays 2DR, 3DR, 4DR, 5DR are provided for car A with the corresponding relays for car B.

The operating windings for the call storing relays at each floor for the same direction of travel are arranged to be energized through a selecting resistor. By means of this resistor a subsequent operation of a hall call button after a call has once been registered, but not cancelled, will be ineffective to operate another call storing relay, even though the floor at which a call has previously been registered may, at that time, be included in the zone of another car. This function takes place because of the lack of sufficient voltage to effect the operation of a second call storing relay, due to the drop in voltage through the selecting resistor caused by the current flowing through it and through the operating winding of the call storing relay which was first energized. For the up call storing relays, selecting resistors 1RSU, 2RSU, 3RSU, 4RSU are provided, while for the down call storing relays, selecting resistors 2RSD, 3RSD, 4RSD, 5RSD are respectively provided.

A call is cancelled by deenergizing the operating winding of the previously operated call storing relay. This is effected by shunting down the energizing operating winding, and for this purpose, shunting resistors are provided. For the up call storing relays, shunting resistors 1RU, 2RU, 3RU, 4RU are provided, respectively, while for the down call storing relays, shunting resistors 2RD, 3RD, 4RD, 5RD are provided.

A registered call on a particular car may be cancelled by the car answering the call as it leaves the floor, or by transferring the car to maintenance operation, or by the car reversing between terminals, or operating the by-pass switch MBP. In the latter two cases, the call is transferred to the next car whose zone is advanced to include the floors assigned to the car which has either been placed on maintenance operation or whose by-pass switch has been operated.

*Apparatus shown in Fig. 4 of the drawings*

Referring now particularly to Fig. 4 of the drawings, it will be observed that car A is provided with up position relays 1UP, 2UP, 3UP, 4UP and with down position relays 2DP, 3DP, 4DP, 5DP, which are arranged to be operated in accordance with the position of car A. It will be observed that the up position relays are connected, respectively, to contact segments 1a, 2a, 3a, 4a, of the floor selector, while the down position relays are connected, respectively, to segments 2b, 3b, 4b, 5b. Floor selector segments 1b and 1a, and 5b and 5a are interconnected in order to effect the operation of the holding relay H as the car approaches the terminals, and to prepare the shunting circuit for the call storing relays individual to the top and bottom terminals. As set forth hereinbefore, brush a is arranged to successively engage the floor segments 1a through 5a, while brush b is arranged to engage the floor segments 5b through 1b. It will be observed that the brushes a and b are shown in a position corresponding to car A travelling in the downward direction, and at the third floor. However, it will be understood that this showing is merely for illustrative purposes and that the brushes a and b may be positioned along the various floor segments in accordance with the position of the elevator car.

In the event that the by-pass switch MBP is operated to by-pass a call, or in response to other functions, as a result of which calls should be by-passed, the circuits for energizing the car position relays are opened by the successive operation of contact members I2 and P2 of a by-pass relay I, and an auxiliary by-pass relay P, the functioning of which will be set forth in detail hereinafter.

In order to assign zones of floors to the various cars, up zoning relays 2UX, 3UX, 4UX are provided, which are responsive to the operation of the various up position relays. Down zoning relays 2DX, 3DX, 4DX, which are arranged to be responsive to the operation of the down position relays individual to each car, are also provided. By means of the zoning relays, the various floors are included in zones, each zone being individual to a different car, the number of floors in each zone depending upon the relative positions of the various cars. Since it is desired that a zone for a car be kept intact as long as it should be assigned thereto, a slight time-delay on the drop-out of the zoning relays is provided. This may be effected, as illustrated in Fig. 4AA of the drawings, by the provision of a copper slug around the operating winding to maintain the contact members of the various zoning relays in the operated condition for a predetermined time after the operating windings are deenergized. In the event that the by-pass relay individual to a car is operated, contact members Q1 of this relay are opened to prevent further control of the zoning relays by that particular car in response to the operation of its position relays.

In response to the combined operation of the car position relays and the zoning relays, car selecting relays are operated. For this purpose, for the up direction car selecting relays 1UY, 2UY, 3UY, 4UY are provided, while for the down direction car selecting relays 2DY, 3DY, 4DY, 5DY are provided. The operation of the car selecting relays determines the call storing relay which will be operated, and consequently, the car to which a hall call will be assigned.

At a terminal certain of the car selecting relays are arranged to be energized in response to the operation of the dispatcher. On the giving of the next up signal at contact members ANU1, a circuit is completed for energizing the operating winding of the up car selecting relay 1UY and also any other car selecting relays in the zone for car A. As a result, the car selecting relays for car A up to the zone of the next car will be energized on giving of the next signal. In like manner, on the giving of the next down signal, contact members AND1 are closed to similarly energize the operating winding of the down car selecting relay 5DY, and as many other of the down selecting relays as are included in the zone away from the top terminal to the zone of the next car.

The car selecting relays are further controlled by the operation of the by-pass relay Q at contact members Q2, which serves to prevent any later registered calls from being effective to operate any of the call storing relays of car A. An additional control feature is provided in response to the operation of a selective relay S, which is effective when two cars are present at a floor and are operating in the same direction for determining to which car the zone away from the floor will be assigned. Contact members S1 are provided for this purpose, and as indicated, a slight time delay on opening of them is provided by means of a dashpot. Since the selective relay S, as will be set forth hereinafter, is periodically energized and deenergized as the car moves from floor to floor, the time delay is desired in order to maintain the zone assigned to car A intact.

With the exception of the zoning relays which are common to both cars A and B and to any other cars which may be in the bank, the apparatus shown on the right-hand side of Fig. 4 and individual to car B is identical with that described hereinbefore in connection with car A. As described hereinbefore, the prefix B is provided for indicating the apparatus which is individual to car B, but which is identical with that used in conjunction with car A.

Figure 5:
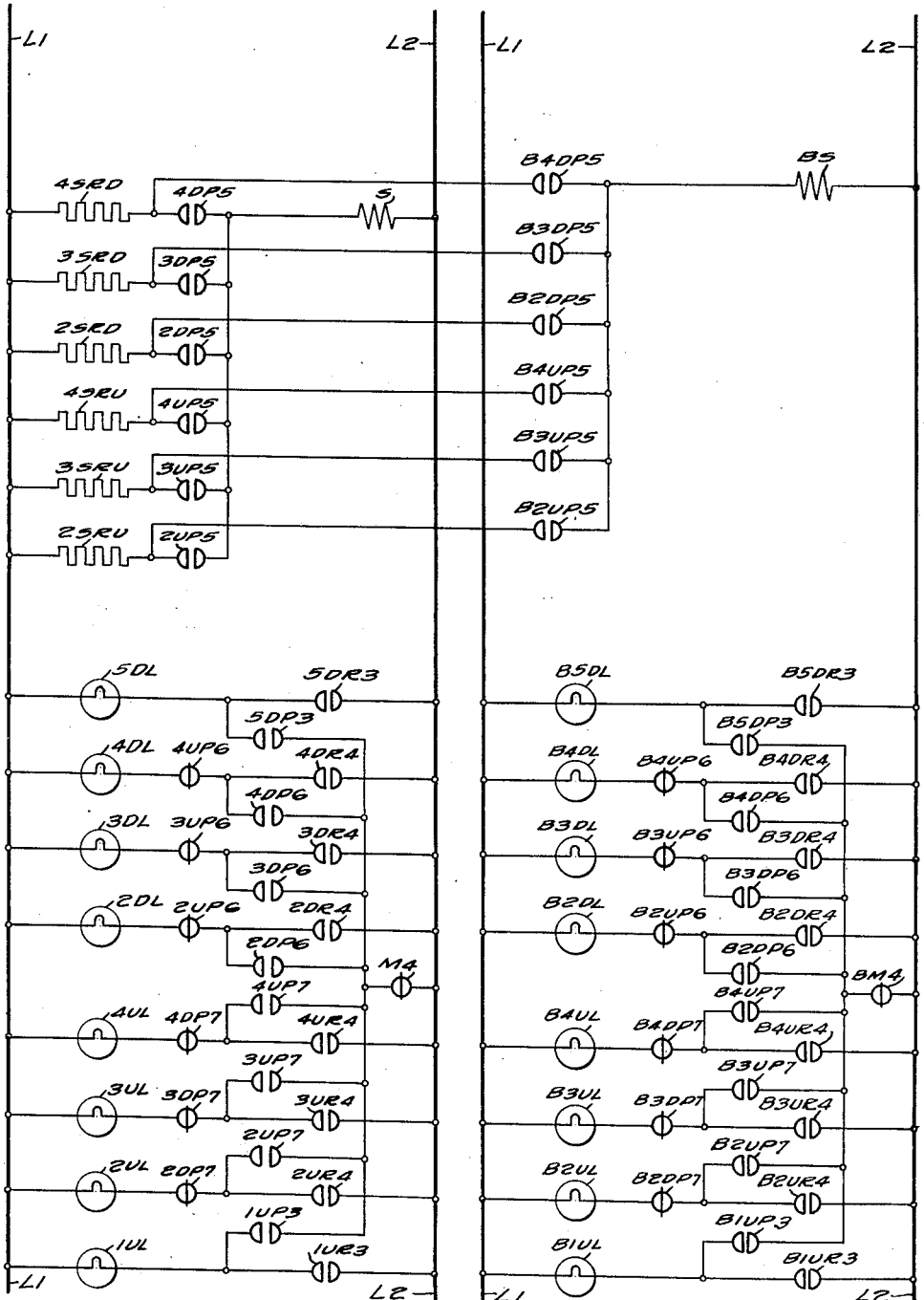
Figure 5A:
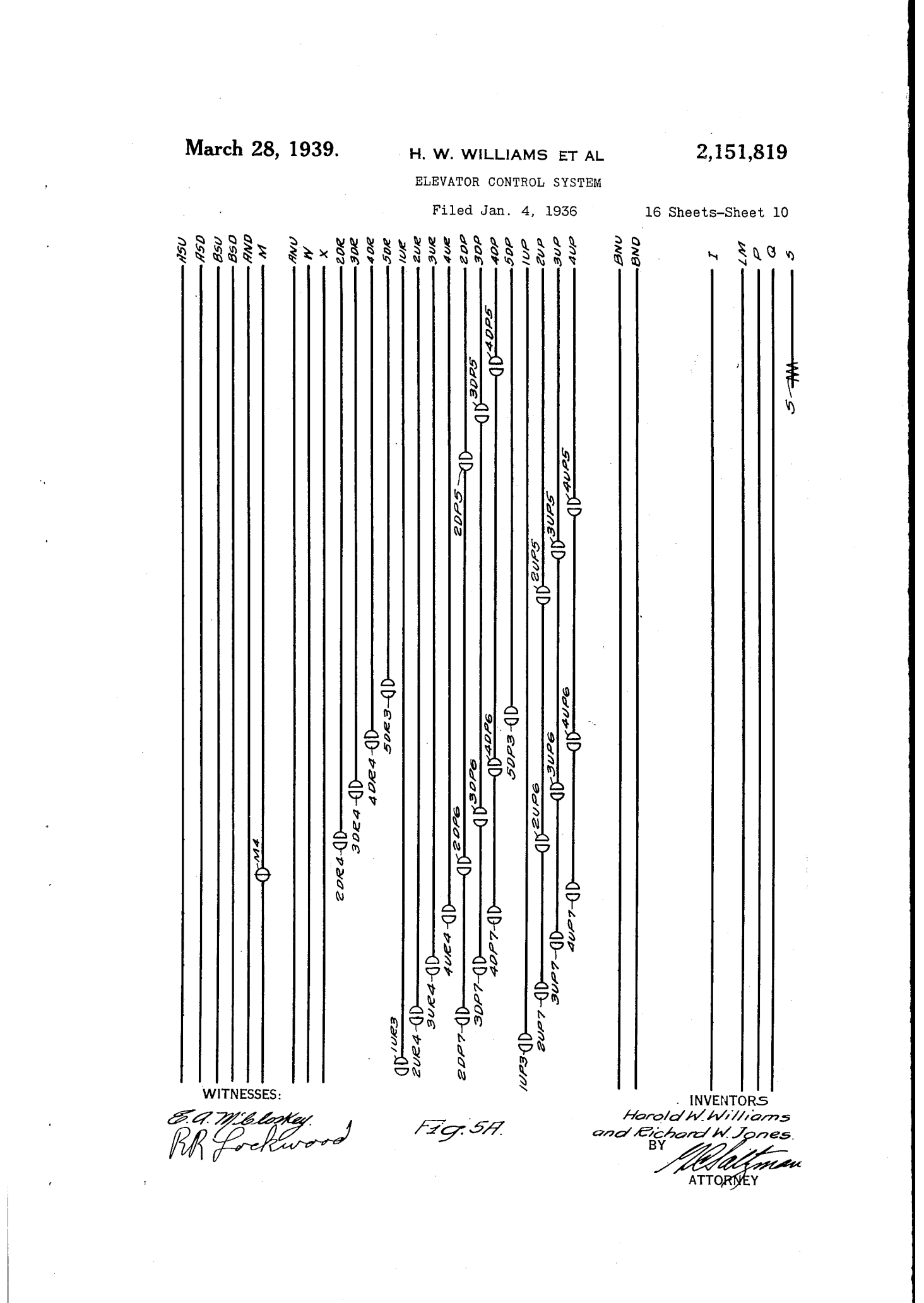

*Apparatus shown in Fig. 5 of the drawings*

Referring now particularly to Fig. 5 of the drawings, it will be observed that car A is provided with a selectivity relay S which is arranged to be operated by the car position relays under control of the floor selector. As car A passes each floor, its selectivity relay S is successively energized and deenergized. Its contact members S1, shown in Fig. 4 of the drawings, are provided with a slight time-delay on opening, as pointed out hereinbefore, so that the successive energization and deenergization of the operating winding of the selectivity relay S will not cause these contact members to be opened, unless the operating winding remains deenergized for a time sufficiently long to permit the contact members to be opened. The operating winding of the selectivity relay S is energized through selectivity resistors 2SR, 3SRU, 4SRU, corresponding to the up position relays and through selectivity resistors 2SRD, 3SRD, 4SRD, corresponding to the down car position relays. By means of these resistors, it is possible to differentiate between the various selectivity relays which will be energized. Thus, if car A is the first to arrive at a floor, its selectivity relay S will be energized. If car B later arrives at the same floor, travelling in the same direction, the operating winding of its selectivity relay BS will not be sufficiently energized because of the voltage drop through the selectivity resistor caused by the current already flowing through the operating winding of the selectivity relay S, and as a result, its operating winding will not again be fully energized. Therefore, after the expiration of a slight time-delay, its contact members BS1, Fig. 4, will be opened and car B will lose its zone. Had car B been the first to arrive at the floor, then it would have allotted to it the zone ahead of the particular floor and car A, because of its later arrival, would have no zone assigned to it. As soon as the cars are separated, they automatically resume their places in the zoning system and calls will, accordingly, be assigned to them.

It will further be observed that up hall lanterns 1UL, 2UL, 3UL, 4UL are provided for car A at the corresponding floors, and that down hall lanterns 2DL, 3DL, 4DL, 5DL are likewise provided. Car B, and other cars in the bank, are likewise provided with hall lanterns individual to each floor and, for the intermediate floors, individual to each direction of travel. As set forth hereinbefore, the hall lanterns are lighted as soon as a call is registered, the hall lantern lighted being individual to the car which will stop to answer the call. In the event that a car stops at a floor in response to a car call, the hall lantern thereof will be lighted when the car stops, corresponding to the direction in which the car is travelling.

Figure 6:
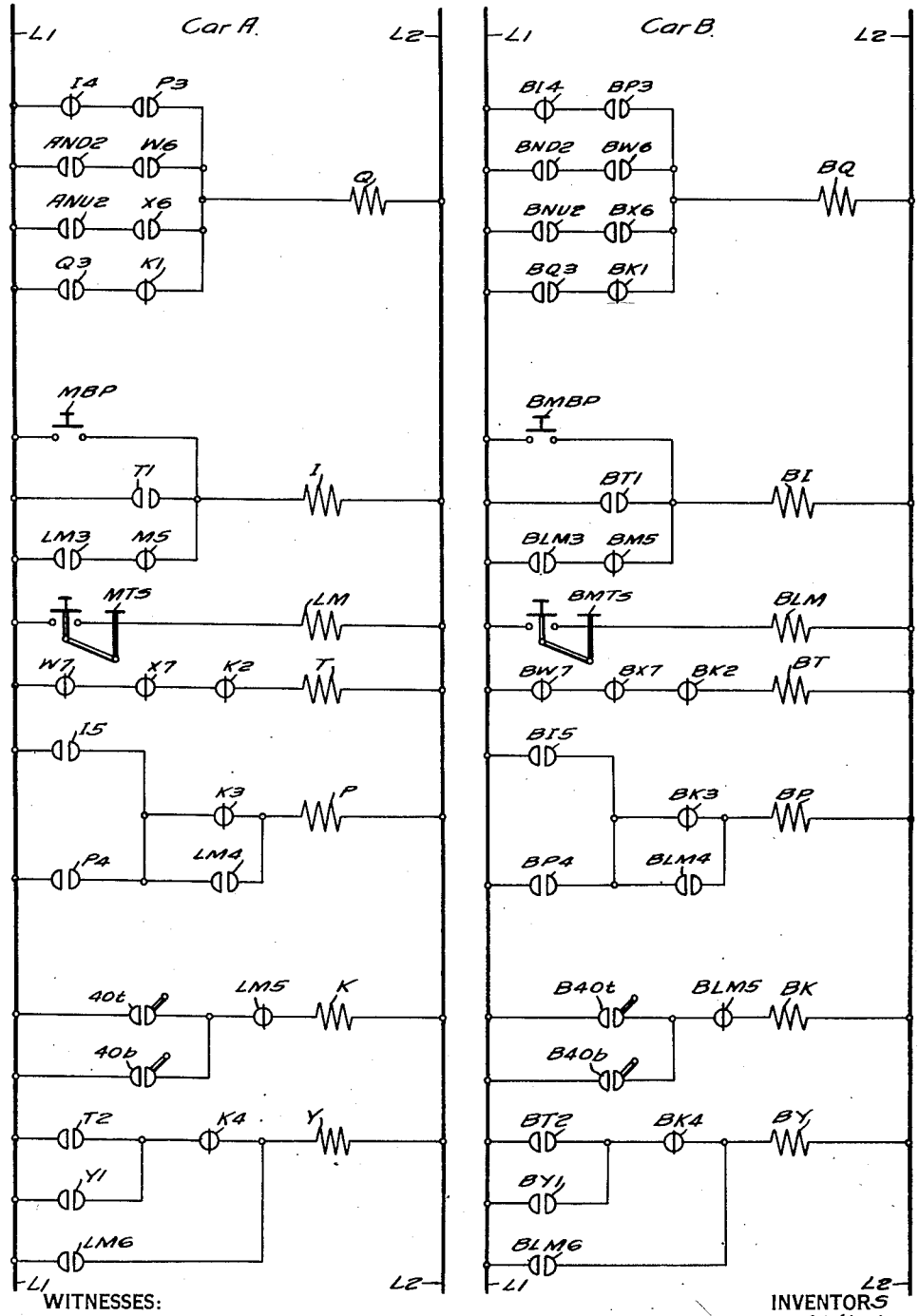

*Apparatus shown in Fig. 6 of the drawings*

Referring now particularly to Fig. 6 of the drawings, it will be observed that apparatus is there shown which is effective to take care of certain situations or combinations of circumstances which may be considered as being outside of the normal scope of functioning of the elevator system. For example, it is preferable that the cars operate on a predetermined schedule between the various floors, and that a car continue in one direction until it reaches the next terminal. It is often not possible to effect this desired operation in view of the unsymmetrical placing of the hall calls and car calls which must necessarily exist in the use of a bank of elevators in supplying service to a building. It is, therefore, desirable to provide means for taking care of these various situations which may be outside of what may otherwise be considered the normal functioning of the system.

In some instances, a car may be delayed because it has been necessary for it to stop in response to hall calls, or car calls, or because it has been delayed at one or more floors for some reason. While it is approaching a terminal, therefore, it may receive a next signal indicating that it is the car which is next to leave the terminal. It is often desired that the car be at that terminal when the next signal is given. If such is not the case, it should arrive at the terminal without delay so that it may be ready to leave the terminal as soon as the start signal is given.

In order to cause the car to reach the terminal without delay, it is desirable to prevent its being stopped in response to hall calls registered after the next signal is given. For this purpose, an automatic by-passing relay Q is provided, which may be energized when the next signal is given. As shown, at contact members AND2 of a next down relay or at contact members ANU2 of a next up relay, energizing circuits will be completed for the operating winding of the automatic by-passing relay Q. A description of the next up and next down relays will be set forth hereinafter in connection with the description of the dispatcher.

The operator may wish to by-pass calls already registered for a car and also to prevent later registered calls from stopping the car. This may be the case when the car is already filled to capacity and it would be useless to stop for additional passengers. For this purpose, a by-pass relay I is provided which may be energized by a manual by-pass switch MBP. The energization of the by-pass relay will complete a circuit for energizing an auxiliary by-pass relay P, which locks in, and on release of the manual by-pass switch, a circuit is completed for energizing the operating winding of the automatic by-passing relay Q. As a result of this operation, on car A for example, the car will lose its zone and will not be responsive to any hall calls. Its previously registered hall calls will be transferred to the car having the next zone. Car A will lose its zone and will proceed to the next terminal.

In the event that a car reverses in the hatchway between the terminals, considerable time will be lost and the departure of the remaining cars from the various terminals may be delayed because of the additional time required for the car which reversed in the hatchway to reach the next terminal. It is, therefore, desirable to remove a car which reverses in the hatchway from the dispatching system. For this purpose, a car reversal relay T is provided, the operating winding of which is energized on reversal of a car, due to the simultaneous deenergization of the car direction relays W and X. It will be observed that the energization of the car reversal relay T completes a circuit for energizing the operating winding of the by-pass relay I. As a result of the operation of the by-pass relay I, a sequence of operations is initiated similar to that which takes place when the manual by-pass switch MBP is operated and which has been previously described.

It is often necessary to remove the car from operation under control of the dispatcher and to place it on what may be termed maintenance service. When on such service, repairs may be made to the elevator car or associated apparatus, and necessary adjustments may be made. Also, under such operation, the car may be operated specially between certain floors or for whatever purpose is desired. Under such operating conditions, however, it is desirable to remove the particular elevator car entirely from control of the dispatcher, so that the remaining cars will be unaffected by the one car. For this purpose, a maintenance relay LM is provided, the operating winding of which may be energized by means of a maintenance switch MTS. The maintenance switch MTS is of the walking beam type, and its contact members remain in the closed condition until the operator manually opens them. In response to the operation of the maintenance relay LM, the by-pass relay I is operated when the car is stopped and the sequence takes place which, as previously described, is the same as takes place on the operation of the manual by-pass switch MBP. However, as long as the maintenance switch MTS remains in the operated position, the car cannot be restored to its place in the dispatcher.

In response to the operation of either the car reversal relay T or the maintenance relay LM, circuits are completed for energizing the operating winding of a dispatcher disconnecting relay Y. Thus, when the car reverses in the shaft, or is transferred to maintenance operation, the dispatcher is disconnected from the car so operated.

In order to restore a car which has been removed from the dispatcher sequence to the control of the dispatcher, a releasing relay K is provided, the operating winding of which is arranged to be energized when the car arrives at either terminal. Thus, if the car is taken out of the dispatcher sequence because of its reversal in the hatchway, releasing relay K will be energized at the top terminal by the operation of top limit switch 40t, or at the bottom terminal by the operation of bottom limit switch 40b, so that the car is automatically restored to the dispatcher sequence. However, if the car is removed from the dispatcher sequence in response to its being transferred to maintenance operation, then the releasing relay K will not be energized until the maintenance switch MST is restored to the non-operated condition.

Figure 7:
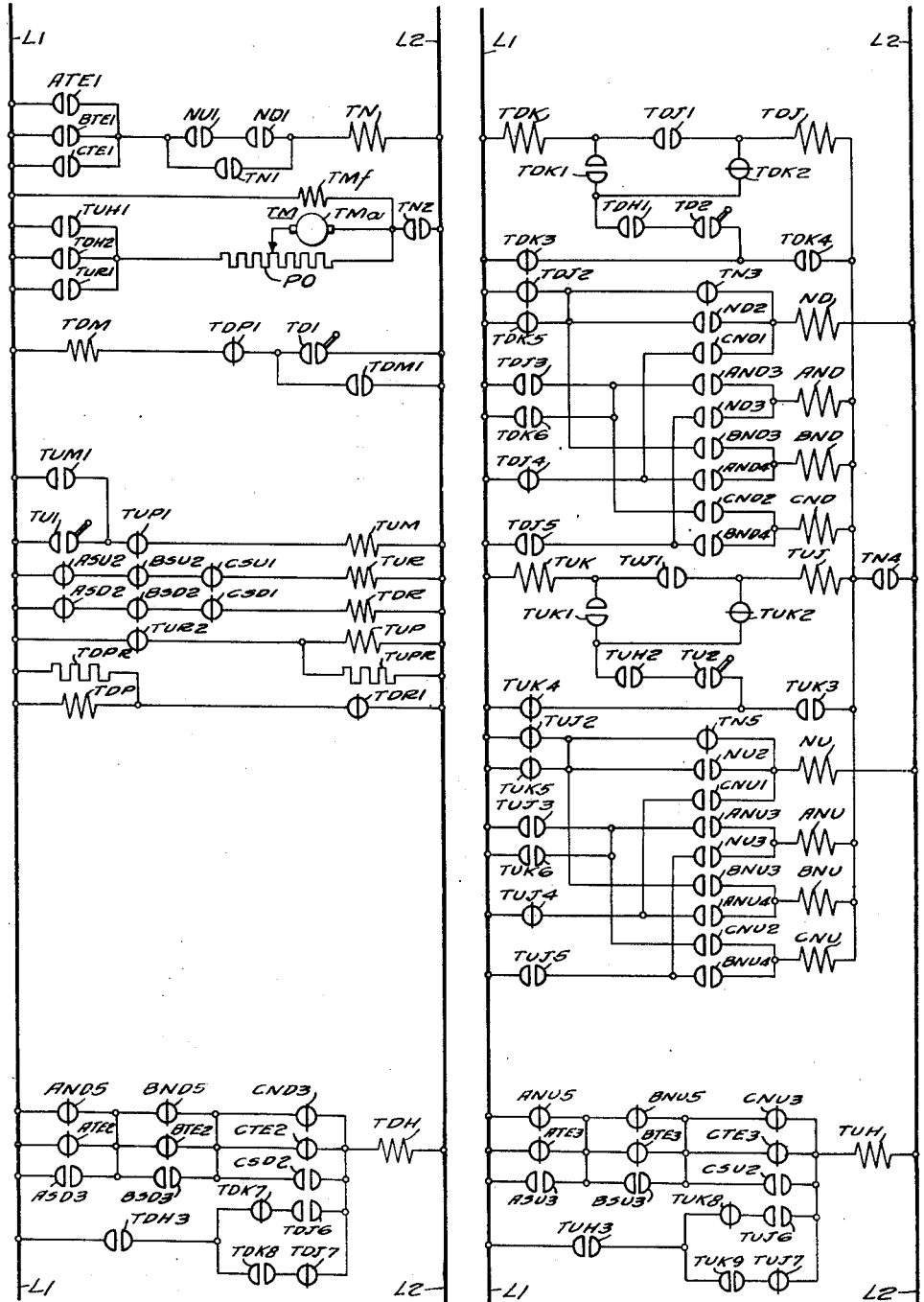
Figure 7A:

*Apparatus shown in Fig. 7 of the drawings*

Referring now particularly to Fig. 7 of the drawings, it will be observed that the apparatus associated with the dispatcher is there shown. In order to more completely set forth the functioning of the dispatcher, it has been shown as being adaptable for use with three cars, A, B, C. Accordingly, apparatus which is individual to these cars has applied thereto a reference character, the prefix of which indicates the car with which it is associated. The remaining apparatus, the first letter of which is other than A, B, or C, is common to all of the apparatus.

In order to initiate the functioning of the dispatcher, a dispatcher starting relay TN is provided. This relay is effective to initiate the operation of a timer motor TM which is provided with an armature TMa and a field winding TMf. The speed at which the timer motor operates may be adjusted by means of a potentiometer PO, as illustrated. The timer motor TM is arranged to operate up and down impulse timer contact members TUI and TDI, respectively, to provide the start up and start down signals for the various cars. In addition, the timer motor TM is arranged to operate up and down chain driving timer contact members TU2 and TD2.

A typical arrangement of the timer motor TM and the contact members operated thereby is illustrated diagrammatically in Fig. 9 of the drawings. As there shown, it will be observed that the armature TMa of the timer control motor TM is arranged to drive a shaft 90 through a gear reduction mechanism 91, which may have a reduction of 75:1. The motor TM may, for example, be operable at 1800 revolutions per minute. A second shaft 92 is provided, which may be driven through a gear reduction mechanism 93 operatively connected to the shaft 90 and having a gear reduction of 8:1. Mounted on the shaft 90 are two cams 94 and 95, which are arranged, respectively, to close up and down chain driving contact members TU2 and TD2. In like manner, the shaft 92 is provided with cams 96 and 97, which are arranged, respectively, to close up and down impulse timer contact members TUI and TDI. These contact members are all illustrated in the closed position. Since the shaft 90 operates at a speed which may be 8 times that of the speed of rotation of the shaft 92, it will be understood that the up and down chain driving contact members TU2 and TD2 will be closed and opened eight times for each time that the up and down impulse timer contact members TUI and TDI are closed and opened. The functioning of these contact members will be set forth in detail hereinafter.

In the event that a start signal is given to a car which is not at a terminal to receive it, it is desirable to store this signal until the car arrives at the floor and then may respond to it. For this purpose, up and down start signal storing relays TUM and TDM are provided. These relays are controlled by the up and down impulse timer contact members TUI and TDI.

In response to the operation of the up chain driving contact members TU2, up chain driving relays TUJ and TUK are operated. These relays are arranged to be successively energized and deenergized in response to the operation of the up chain driving contact members TU2, as will be set forth. Likewise, in response to the operation of the down chain driving timer contact members TD2, down chain driving relays TDJ and TDK are operated.

In response to the operation of the up chain driving relays TUJ and TUK, a relay chain is operated. As illustrated in this particular embodiment of the invention, the relay chain comprises four relays, an auxiliary next up relay NU and next up relays ANU, BNU, CNU, individual to cars A, B, C, respectively. Likewise, a down chain of relays is provided comprising an auxiliary next down relay ND and next down relays AND, BND, CND, individual, respectively, to cars A, B, C.

In order to start the timer motor TM, a motor starting relay TUR is provided. This relay functions to again start the motor TM after it has been stopped in response to the operation of either up motor stopping relay TUH or down motor stopping relay TDH. For effecting certain control functions which will be indicated hereinafter, an auxiliary relay TDR is provided, together with auxiliary up and down time-delay relays TUP and TDP. The time-delay for the latter two relays is obtained by the use of resistors TUPR and TDPR shunted around the respective operating windings of the time-delay relays.

Figure 8:
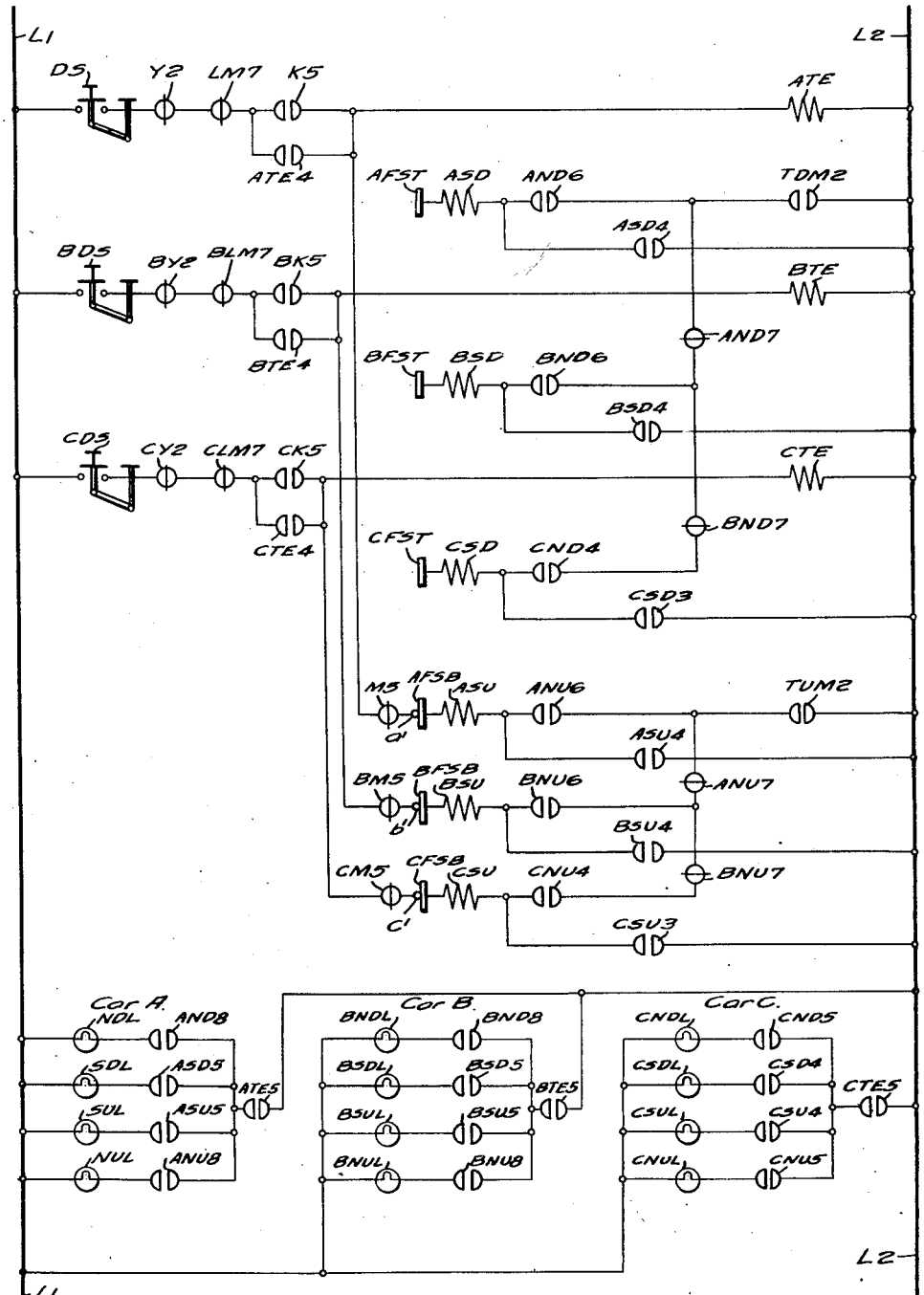

Apparatus shown in Fig. 8 of the drawings

Referring now particularly to Fig. 8 of the drawings, it will be observed that cars A, B and C are provided, respectively, with dispatcher control relays ATE, BTE, CTE. These relays are, respectively, under the control of dispatcher control switches which, for car A, are indicated by the reference character DS, while for cars B and C, they are represented by the reference characters BDS and CDS. The dispatcher control switches are positioned in the panels of the respective cars, as set forth hereinbefore.

In order to provide the start up and start down signals for each car, start up relays and start down relays are provided individual thereto. Thus, start up relays ASU, BSU, CSU are provided for cars A, B, C, and start down relays ASD, BSD, CSD are provided for these cars. It will be observed that the start up and start down relays can be energized only when the car individual thereto is located at the corresponding terminal. In order to complete the energizing circuits for the operating windings for the start up and start down relays, segments on the floor selectors of the various cars are provided. Thus, for the bottom terminal floor selector segments AFSB, BFSB, CFSB are provided for cars A, B and C. Similarly, for the top terminal segments AFST, BFST, CFST are provided. These segments are arranged to be energized by brushes a', b', c', which, as set forth hereinbefore, move in accordance with the movement of the respective elevator car as carried by the brush carriage.

Each car is provided with four signal lights to indicate to the operator when his car is the next car to leave either terminal, and when his car is to start from either terminal. Thus, for car A a next up light NUL is provided. For cars B and C, in like manner, next up lights BNUL and CNUL are provided. For the down direction for car A, next down light NDL is provided. For cars B and C next down lights BNDL and CNDL are provided.

In response to the operation of the various start up and start down relays corresponding start up and start down lights are lighted. For car A, start up light SUL is provided and for cars B and C start up lights BSUL and CSUL are provided. In like manner, for the down direction, start down light SDL for car A is provided, and for cars B and C start down lights BSDL and CSDL are provided.

Operation of dispatcher

In order to set forth the novel functioning of our control and signalling system, a description of the operation of the dispatcher first will be given, since the normal functioning of the elevator system is in a sense under control of the dispatcher. That is, signals are given to the cars which indicate when they are next to leave a terminal and when they are to start from the terminal. Under normal operation, a car cannot leave a terminal until it receives a start signal. Further, in the event that a car is behind schedule and receives a next signal while it is approaching a terminal, calls registered afterwards, which would otherwise be effective to stop the car, are ineffective to stop the car and the calls are automatically transferred to the car having the next zone.

In describing the operation of the dispatcher it will be assumed that the control conductors Ll and L2 have applied thereto a control voltage. Since these conductors are assumed to be energized, motor starting relay TUR, motor stopping relay TUH and the auxiliary next up relay NU will be energized. Also, auxiliary relay TDR, motor stopping relay TDH and the auxiliary next down relay ND will be energized. The circuits for energizing these relays may be traced as follows:

For relay TUR:

Ll, ASU2, BSU2, CSUl, TUR, L2

For relay TUH:

Ll, ANU5, BNU5, CNU3, TUH, L2

For relay TDH:

Ll, AND5, BND5, CND3, TDH, L2

For relay NU:

Ll, TUJ2, TN5, NU, L2

For relay TDR:

Ll, ASD2, BSD2, CSDl, TDR, L2

For relay ND:

Ll, TDJ2, TN3, ND, L2

At contact members NU2 and ND2 holding circuits are completed for the operating windings of relays NU and ND.

It will be further assumed that all of the cars are at the bottom terminal. In such case, releasing relay K, Fig. 6, will be energized. Its circuit may be traced as follows: Ll, 40b, LM5, K, L2. It will be further assumed that the operators press the control switches DS, BDS, CDS, Fig. 8. As a result, dispatcher control relays ATE, BTE, CTE are energized and remain in the energized condition as long as the dispatcher control switches remain in the operated positions, and the maintenance relay LM and the dispatcher disconnecting relay Y are not operated. The circuit for energizing these relays are as follows:

For relay ATE:

Ll, DS, Y2, LM7, K5, ATE, L2

For relay BTE:

Ll, BDS, BY2, BLM7, BK5, BTE, L2

For relay CTE:

Ll, CDS, CY2, CLM7, CK5, CTE, L2

Contact members K5, BK5 and CK5 are, respectively, shunted by contact members ATE4, BTE4, CTE4 on operation of the corresponding relays to provide the desired holding circuits.

As a result of the operation of any one of the dispatcher control relays ATE, for example, a circuit is completed for effecting the energization of the operating winding of dispatcher starting relay TN, Fig. 7.

Ll, ATEl, NUl, NDl, TN, L2

At contact members TNl a holding circuit is completed around contact members NUl and NDl. Since contact members TUH l and TDH2 are closed, and further since contact members TN2 are now closed, the timer motor TM is energized.

As a result of the operation of the timer motor TM, up chain driving contact members TU2 are closed and a circuit is completed for energizing the operating winding of the up chain driving relay TUJ.

Ll, TUK4, TU2, TUH2, TUK2, TUJ, TN4, L2

As soon as contact members TU2 are opened, the operating winding of the up chain driving relay TUK is energized in series circuit relation with the operating winding of the up chain driving relay TUJ.

Ll, TUK, TUJl, TUJ, TN4, L2

As a result of the energization of the up chain driving relay TUJ, a circuit is completed for energizing the operating winding of the next up relay ANU for car A.

Ll, TUJ5, NU3, ANU, TN4, L2

The next up relay ANU holds over the following circuit:

Ll, TUJ3, ANU3, ANU, TN4, L2

The next up signal NUL for car A is then given.

Ll, NUL, ANU8, ATE5, L2

The previously traced energizing circuit for the operating winding of the motor stopping relay TUH is opened at contact members ANU5.

As a result of the energization of the chain driving relay TUK, together with the energization of the chain driving relay TUJ, the holding circuit for the operating winding for the auxiliary next up relay NU is opened and the latter is deenergized.

Since it is assumed that no car is at the top terminal and further, since car A is the first car which will arrive at the top terminal it, at this time, also receives a signal indicating that it is the next car to leave the top terminal. This signal is given in response to the closing of the down chain driving contact members TD2, which are effective to energize the operating winding of the down chain driving relay TDJ.

Ll, TDK3, TD2, TDHl, TDK2, TDJ, TN4, L2

As soon as contact members TD2 are opened the operating winding of the down chain driving relay TDK is energized in series circuit relation with the operating winding of the down chain driving relay TDJ.

Ll, TDK, TDJl, TDJ, TN4, L2

In response to the operation of the down chain driving relay TDJ, a circuit is completed for energizing the next down relay AND.

Ll, TDJ5, ND3, AND, TN4, L2

The next down relay AND holds over the following circuit:

Ll, TDJ3, AND3, AND, TN4, L2

The next down signal is then given to car A.

Ll, NDL, AND8, ATE5, L2

The previously traced energizing circuit for the operating winding of the motor stopping relay TDH is opened at contact members AND5.

The continued operation of the timer motor TM causes up impulse timer contact members TUl to be closed. As a result, the up start signal storing relay TUM is energized.

Ll, TUl, TUPl, TUM, L2

A holding circuit is completed at contact members TUMl around the up impulse contact members TUl. At the same time, down impulse contact members TDl are closed to complete a circuit for energizing the operating winding of the down start signal storing relay TDM.

L1, TDM, TDP1, TD1, L2

At contact members TDM1 a holding circuit is completed around contact members TD1.

In response to the operation of the up signal storing relay TUM, a circuit is completed for energizing the operating winding of the start up relay ASU. This circuit will be completed since car A is assumed to be at the bottom terminal.

L1, DS, Y2, LM7, ATE4, M5, a', AFSB, ASU, ANU6, TUM2, L2

At contact members ASU4 a holding circuit is completed for the operating winding of the start up relay ASU. The start up light SUL is then lighted.

L, SUL, ASU5, ATE5, L2

A further result of the energization of the start up relay ASU is to open the previously traced circuit for the motor starting relay TUR. In addition, the motor stopping relay TUH is again energized.

L1, ASU3, BNU5, CNU3, TUH, L2

In response to the deenergization of the motor starting relay TUR, auxiliary time-delay relay TUP is energized.

L1, TUR2, TUP, L2

Since no car is at the top terminal to receive a start signal at the time that the start signal is given to car A, this signal will be stored by the signal storing relay TDM until car A, for example, arrives at the top terminal.

The continued operation of the timer motor TM causes up chain driving contact members TU2 to again be closed. At this time, the closure of these contact members is effective to shunt down the operating winding of the chain driving relay TUJ over the following circuit:

TUJ, TUJ1, TUK1, TUH2, TU2, TUK3, TUJ

As soon as chain driving contact members TU2 are opened, the energizing circuit for the operating winding of the chain driving relay TUK is opened and it also is deenergized.

As a result of the deenergization of the chain driving relay TUJ, a circuit is completed for energizing the operating winding of the next up relay BNU.

L1, TUJ4, ANU4, BNU, TN4, L2

A holding circuit is completed for the next up relay BNU as follows:

L1, TUJ2, BNU3, BNU, TN4, L2

As a result of the deenergization of both of the chain driving relays TUJ and TUK, the previously traced holding circuit for the operating winding of the next up relay ANU is opened, it is deenergized and the next up light NUL is extinguished. Since the next up relay BNU is now energized, the next signal is given to car B and its next up signal BNUL is lighted.

L1, BNUL, BNU8, BTE5, L2

A further result of the energization of the next up relay BNU is to open the previously traced energizing circuit for the operating winding of the motor stopping relay TUH and it is deenergized. Since the circuit for energizing the armature TMa of the timer motor TM is now opened, at contact members TUH1, the timer motor stops.

As long as car A, which has received the start signal, remains at the bottom terminal, no further operation will take place. As soon, however, as it leaves the bottom terminal, the previously traced circuit for energizing the operating winding for the start up relay ASU is opened at the floor segment AFSB, and as a result, this relay is deenergized and the start up signal SUL for car A is extinguished. As a further result of the deenergization of the start up relay ASU, the motor starting relay TUR is again energized to again initiate the operation of the timer motor TM. The energization of the motor starting relay TUR opens the energizing circuit for the operating winding of the auxiliary time-delay relay TUP and it is deenergized. Its contact members, however, remain in the closed position for a time interval after the operating winding is deenergized, due to the time-delay introduced by the resistor TUPR. This time interval is sufficiently long to permit the motor TM to open the up impulse timer contact members TU1 in the event that it should have stopped in such a position that they are closed before contact members TUP1 are closed.

The motor now causes down impulse timer contact members TD1 to again be closed, but since the down start signal storing relay is still energized, no further operation takes place. Up impulse timer contact members TU1 are closed to again energize the up start signal storing relay TUM, and as a result, since car B is at the bottom terminal, the start up relay BSU is energized.

L1, BDS, BY2, BLM7, BTE4, BM5, b', BFSB, BSU, BNU6, ANU7, TUM2, L2

At contact members BSU4 a holding circuit is provided for the operating winding of the start up relay BSU. Car B now receives the start up signal since its start up light is lighted.

L1, BSUL, BSU5, BTE5, L2

As a result of the operation of the start up relay BSU, the energizing circuit for the operating winding of the motor starting relay TUR is opened and it is deenergized. A further result is the energization of the operating winding of the motor stopping relay TUH.

L1, ANU5, BSU3, CNU3, TUH, L2

In response to the deenergization of the motor starting relay TUR, auxiliary time-delay relay TUP is energized, and it, in turn, opens the contact members TUP1 of the energizing circuit for the operating winding for the up start signal storing relay TUM.

Up chain driving contact members TU2 are again closed and as a result, chain driving relay TUJ is energized and in series with its operating winding, the operating winding of the chain driving relay TUK is energized. In response to the operation of the chain driving relay TUJ the next up relay CNU for car C is energized.

L1, TUJ5, BNU4, CNU, TN4, L2

A holding circuit is then provided for the operating winding of the next up relay CNU.

L1, TUJ3, CNU2, CNU, TN4, L2

Since both chain driving relays TUJ and TUK are now energized, the previously traced holding circuit for the next up relay BNU is opened, it is deenergized and the next up light BNUL is extinguished. Car C now receives the next up signal by the illumination of its next up lamp CNUL.

L1, CNUL, CNU5, CTE5, L2

At contact members CNU3, the previously traced energizing circuit for the operating winding of the motor stopping relay TUH is opened and this relay is deenergized. In response to the deenergization of the motor stopping relay TUH, the timer motor TM is stopped. No further action takes place, since car B has received its start signal and has not left the bottom terminal.

It will now be assumed that car B leaves the bottom terminal, and as a result, at floor segment BFSB, the previously traced energizing circuit for the operating winding of the start up relay BSU is opened. This relay is deenergized and the start up signal BSUL is extinguished. In response to the deenergization of the start up relay BSU the motor starting relay TUR is again energized and the motor TM is again started. A further result of the energization of the motor starting relay TUR is to again effect the deenergization of the auxiliary time-delay relay TUP.

It will now be assumed that car A arrives at the top floor. Since the down start signal storing relay TDM is energized, the start down signal is immediately given to car A and its start down relay ASD is immediately energized.

L1, DS, Y2, LM1, ATE4, M5, a', AFST, ASD, AND6, TDM2, L2

At contact members ASD4, a holding circuit is completed for the operating winding of the start down relay ASD. In response to the operation of the start down relay ASD the start down signal light SDL is lighted in car A.

L1, SDL, ASD5, ATE5, L2

As a further result of the energization of the start down relay ASD, the energizing circuit for the operating winding for the auxiliary relay TDR is opened and it is deenergized. In addition, the motor stopping relay TDH is again energized to permit the down chain driving contact members TD2 to be effective to successively deenergize and energize the operating winding of the chain driving relays TDJ and TDK.

L1, ASD3, BND5, CND3, TDH, L2

As a result of the deenergization of the auxiliary relay TDR, the auxiliary time-delay relay TDP is energized,

L1, TDP, TDR1, L2 and in response to its being energized, the operating winding of the down start signal storing relay TDM is deenergized.

The down chain driving contact members TD2 on their next closure, are effective to shunt down the operating winding of the down chain driving relay TDJ.

TDJ, TDJ1, TDK1, TDH1, TD2, TDK4, TDJ

As soon as contact members TD2 are opened, the energizing circuit for the operating winding of the chain driving relay TDK is opened and it is deenergized.

In response to the deenergization of the chain driving relay TDJ, a circuit is completed for effecting the energization of the next down relay BND.

L1, TDJ4, AND4, BND, TN4, L2

A holding circuit is completed for the operating winding of the next down relay BND.

L1, TDJ2, BND3, BND, TN4, L2

The next down signal is then given to car B by the illumination of its next down light BNDL.

L1, BNDL, BND8, BTE5, L2

Since both of the chain driving relays TDJ and TDK are now deenergized, the previously traced holding circuit for the operating winding for the next down relay AND is opened and it is deenergized. Accordingly, the next down signal NDL in car A is extinguished. A further result of the energization of the next down relay BND is to open the energizing circuit for the operating winding of the motor stopping relay TDH.

Up impulse timer contact members TU1 are again closed to again effect the energization of the operating winding of the up start signal storing relay TUM. The start up signal is now given to car C by the operation of its start up relay CSU.

L1, CDS, CY2, CLM1, CTE4, CM5, c', CFSB, CSU, CNU4, BNU1, ANU1, TUM2, L2

At contact members CSU4, a holding circuit is completed for the operating winding of the start up relay CSU. The start up light CSUL for car C is now lighted.

L1, CSUL, CSU4, CTE5, L2

As a further result of the energization of the start up relay CSU, the energizing circuit for the motor starting relay TUR is opened. It, in turn, effects the energization of the auxiliary time-delay relay TUP, which, on being energized, opens the energizing circuit for the operating winding of the up start signal storing relay TUM and the latter is deenergized.

It will now be assumed that car A leaves the top terminal and as a result, the energizing circuit for the operating winding of its start down relay ASD is opened at floor segment AFST. This relay is deenergized and the start down signal SDL for car A is extinguished.

It will now be obvious that as the succeeding cars arrive at the top terminal, they will receive the next down signals and the start signals in the proper sequence. The cars then may be considered as being operated from the top and bottom terminals under the control of the dispatcher, the operator starting the cars away from the terminals in response to the receipt of the start signals. In describing the various sequences of operation for each of the cars under different conditions, it will be assumed that the dispatcher is operating as set forth hereinbefore, and, therefore, only such functions thereof as are necessary to illustrate our invention will be described in connection with the various operations.

*Assigning of zone to car A by dispatcher*

Since all of the cars are assumed to be at the bottom terminal, in initiating the functioning of the system, it is desirable to assign all of the floors to car A which is the first car to leave the bottom terminal. In other words, the zone away from the bottom terminal is assigned to car A by the dispatcher. In the particular case, when all of the cars are at the bottom terminal, it will be understood that this zone will include all of the floors. Therefore, at this time, calls registered at any of the floors for either direction of travel, will be assigned to car A.

As soon as the dispatcher is initiated in operation, it will be recalled that the next up relay ANU for car A is operated to signal to car A that it is the next car to leave the bottom terminal. Therefore, referring particularly to Fig. 4 of the drawings, it will be observed that a circuit is completed at contact members ANU1 for energizing the operating windings of all of the car selecting relays 1UY, 2UY, 3UY, 4UY for the up direction. It will also be recalled that the next down relay 5AND is immediately operated, since car A is also the next car to leave the top terminal. As a result, at contact members AND1 a circuit is completed for energizing all of the operating windings for the car selecting relays 2DY, 3DY, 4DY, 5DY.

As succeeding cars are dispatched from the bottom terminal and assume various zones, it will be understood that the zone away from the bottom terminal assigned, for example, to car A at a later time will include the floors in the zone away from the bottom terminal which extends up to the zone of the next car that has just left the bottom terminal.

*Registration of up call at third floor*

Referring now particularly to Fig. 3 of the drawings, it will be assumed that an up call is registered at the third floor by the operation of the up hall call button 3U. It will be assumed that the third floor is included in the zone of car A. As a result, the car selecting relay 3UY will be energized, and since such is the case, the call storing relay 3UR individual to car A will be energized.

L1, 3U, 3RSU, 3UY1, 3UR, 3RU, L2

A holding circuit is provided for the operating winding of the up call storing relay 3UR.

L1, P1, 3UR2, 3UR, 3RU, L2

Up hall lantern 3UL is lighted immediately.

L1, 3UL, 3DP1, 3UR4, L2

In the event that under certain conditions, the zone of car B might include the third floor at a time before the up call storing relay 3UR is deenergized, contact members B3UY1 of the car selecting relay B3UY would be closed. However, if a call is again registered at the third floor for the up direction by a second operation of the up hall call button 3U, the operating winding of the up call storing relay B3UR will not be sufficiently energized to close its contact members because of the voltage drop through the resistor 3RSU caused by the current already flowing therethrough as a result of the previous energization of the operating winding of the up call storing relay 3UR. Therefore, it will be apparent that once a call has been assigned to a particular car, the subsequent registration of a call at that floor for the same direction will not be effective to energize the operating winding of the call storing relay of another car at that same floor even though the zone of the other car may at the time include that floor.

*Registration of down call at second floor*

It will be assumed that before car A leaves the bottom terminal a call is registered for the down direction at the second floor. This will be effected by the operation of the down hall call button 2D. As a result, the operating winding of the down call storing relay 2DR is energized.

L1, 2D, 2RSD, 2DY1, 2DR, 2RD, L2

A holding circuit is completed for the operating winding of the call storing relay 2DR.

L1, P1, 2DR2, 2DR, 2RD, L2

Down hall lantern 2DL is lighted immediately.

L1, 2DL, 2UP6, 2DR4, L2

It will now be understood in the description of the subsequent operation of car A, that calls are registered at the third floor in the up direction and at the second floor in the down direction for this car and that it will answer these calls.

*Sequence for starting car A from bottom terminal*

It will be assumed that the start signal has been given to car A by the illumination of the start up light SUL, and that the operator is ready to start car A in the up direction. It will also be assumed that the transfer switch TS is in the position shown in Fig. 2 of the drawings.

As soon as the conductors L1 and L2 are energized, the up direction relay W is energized.

L1, D6, X1, W, 30t, L2

Since the contact members of the bottom limit switch 30b are opened, the energizing circuit for the down direction relay X will not be completed. As a result of the energization of the up direction relay W, a circuit is completed at contact members W5 for operating the hall button holding windings 2NC, 3NC, 4NC. The motor field winding Mf for the motor MR is energized and as soon as voltage is applied to the armature Ma, it will rotate to move the elevator car in the corresponding direction.

The operator operates the master switch MS to engage the contact member MSU and to complete a circuit for energizing the operating windings of the up reversing switch U and of the auxiliary control relay M.

L1, MS, MSU, ASU1, F1, U, M, door interlocks L2. At contact members U5, a holding circuit is completed for maintaining the energizing circuit for the operating windings of the switch U and the relay M. It will be observed that the previously traced energizing circuit was completed through the contact members ASU1 of the start up relay ASU. Until the start up relay is operated and the start up signal is given it will, therefore, not be possible for the operator to initiate the movement of the car away from the bottom terminal for the reason that while it is at the bottom terminal, the contact members of bottom limit switch 32b are in the open condition.

As a result of the energization of the up reversing switch U, the generator field winding Gf is energized.

L1, U1, Gf, U3, R1, L2

Also the brake EB is released on energization of the winding EBw.

L1, EBw, U2, L2

A voltage is now generated in the armature Ga of the generator G and is applied to the armature Ma of the motor MR. This voltage is in such direction as to cause the motor MR to move the elevator car away from the bottom terminal. A further result of the operation of the up reversing switch is to complete a circuit for energizing the operating winding of the speed switch V.

L1, U4, E1, V, L2

At contact members V1 the resistor R1 is short circuited to apply full voltage to the field winding Gf of the generator G. The motor MR may then be operated at full speed.

Since Car A has left the bottom terminal, its start up relay ASU will be deenergized. However, as set forth, the energizing circuit for the operating winding of the up reversing switch U is now completed at contact members U5.

Next signal given to car B

It will be recalled that the next up signal is given to car B as the result of the next closure of the up chain driving contact members TU2. Therefore, the next up light BNUL of car B will be lighted, indicating that this car is the next one to leave the terminal.

Since car A is moving upwardly from the bottom terminal, the brush $a$, Fig. 4, will be caused to successively engage the floor selector segments 2a through 5a. When the brush $a$ engages the segment 2a, a circuit is completed for energizing the operating winding of the car position relay 2UP, Fig. 4.

L1, P2, a, 2a, 2UP, L2

As a result of the energization of the position relay 2UP a circuit is completed for energizing the zoning relay 2UX.

L1, I3, Q1, 2UP3, 2UX, L2

All of the contact members of the zoning relay 2UX will then be opened. These are illustrated as the contact members 2UX1 and 2UX2. By means of these contact members the zone assigned to car A successively shifts as it passes upwardly from floor to floor. Thus, as car A continues upwardly, the car position relays are successively energized and deenergized, and correspondingly, the zoning relays are successively energized and deenergized in response thereto. The zone assigned to car A under the assumed conditions will then be all of the floors between it and the top terminal, and all of the floors from the top terminal down to the bottom terminal. Calls registered at these floors will be effective to stop car A.

The timer motor TM is then stopped as long as car A remains at the bottom terminal. However, as soon as it leaves the bottom terminal, it will be recalled that the timer motor TM is again started and subsequently, the start up signal is given to car B.

At the time that the next up signal was given to car B, contact members BNU1 are closed to assign the zone away from the bottom terminal to car B. When car A is at the second floor, contact members 2UX2 of the zoning relay 2UX will be opened and as a result, only car selecting relay B1UY for car B will be energized. As car A continues upwardly from the bottom terminal and successively operates the zoning relays, contact members 2UX1 are closed and contact members 3UX2 are opened. At this time, the operating winding of the car selecting relay B2UY will be energized.

Under these assumed conditions, with car A above the second floor and car B at the bottom terminal, a call registered at the second floor, Fig. 3, for the up direction, will be effective to complete a circuit for energizing the operating winding of the up call storing relay B2UR since contact members B2UY1 of the up car position relay B2UY will be closed. It will thus be observed that the zone away from a terminal is assigned to the car next to leave the terminal as soon as it receives the signal that it is the next car to leave the terminal.

Stopping of car A at third floor in response to registered hall call

It will be recalled that it was assumed that a call was registered at the third floor for the up direction of travel for car A. As car A moves upwardly, the brush $a$ engages the segment 3a of the floor selector and completes an energizing circuit for the operating winding of the car position relay 3UP. A circuit is then completed for energizing the operating winding of the stopping relay H, Fig. 2.

L1, 3UR1, 3UP1, H, L2

A circuit is then completed for energizing the operating winding of the slowdown inductor switch E.

L1, H1, TS2, E, M1, L2

The operating winding of the holding relay HR is energized in parallel circuit relation with the operating winding of the slowdown inductor switch E, and at contact members HR1 a holding circuit is completed for the operating windings of the switch E and the relay HR. As soon as the contact members E1 of the inductor switch are moved into proximity with the inductor plate UE individual to the third floor, they will be opened and the previously traced energizing circuit for the operating winding of the speed switch V will be opened. At contact members V1, the shunt circuit around the resistor R1 is opened and the excitation of the field winding Gf is reduced. Since a reduced voltage is applied to the armature Ma of the motor MR, its speed is decreased. In response to the deenergization of the speed switch V, a circuit is completed at contact members V2 for energizing the operating winding of the stopping inductor switch F in parallel circuit relation to the operating winding of the slowdown inductor switch E. As soon as the contact members F1 come into proximity with the inductor plate UF at the third floor, they will be opened and the previously traced holding circuit for the operating windings of the up reversing switch U and the auxiliary control relay M is opened and they are deenergized. Since the up reversing switch U is deenergized, the excitation will be removed from the field winding Gf. Furthermore, at contact members U2, the energizing circuit for the operating winding EBw of the brake is opened and the brake EB is applied.

After the car has been stopped at the third floor in response to the hall call registered at this floor, the operator then may start the car again in an upward direction. The master switch MS is again closed and the sequence described hereinbefore for starting the car is repeated.

It will be recalled that the call storing relay 3UR was held in the operated position over a holding circuit. It is, therefore, necessary to restore this relay to the non-operated condition after the call has been answered. This operation takes place at the time that the car is started away from the third floor on operation of the auxiliary control relay M. It will be observed, Fig. 3, that the auxiliary relay M is provided with two sets of contact members M2 and M3 in series circuit relation. The contact members M2 are provided with a dashpot which is effective to afford a slight time delay in the opening of the contact members M2 on the energization of the operating winding of the auxiliary relay M. Thus momentarily on the energization of the auxiliary relay M, a circuit is completed for shunting down the operating winding of the up call storing relay 3UR. This circuit may be traced as follows:

3UR, 3UR3, 3UP2, M3, M2, P1, 3UR2, 3UR

Since the shunting resistor 3RU is connected in series circuit relation with the operating winding of the up call storing relay 3UR, this shunting action will take place without causing a short circuit between the conductors L1 and L2.

If the transfer switch TS had been operated to the alternate position, thus instead of the car being automatically stopped in response to the registered hall call at the third floor, the car signal light CSL would have been lighted on operation of the stopping relay HR.

L1, H1, TS2, CSL, M1, L2

The holding relay HR will be operated as described hereinbefore. The operator would then center the master switch MS to energize the operating winding of the slowdown inductor switch E.

L1, MS, STOP, TS1, E, M1, L2

The car will be decelerated and on operation of the speed switch V to the deenergized position the operating winding of the stopping inductor switch F will be energized to stop the car as previously described.

*Operation of selectivity relays*

It may be assumed for the purposes of illustration, that car A is delayed at the third floor and further, that car B stops at the third floor in response to the operation of one of its car buttons. It is, therefore, desirable to assign the zone away from the third floor to the car, in this case car A, which first arrived at this floor.

It will be recalled that the car position relays of both of the cars are successively energized and deenergized as the cars move in the hatchway between the terminals. With respect to car A, for example, Fig. 5, its selectivity relay S will be successively energized and deenergized through the selectivity resistors, as previously described. When car A arrives at the third floor, its position relay 3UP will be energized. A circuit will then be completed for energizing the selectivity relay S.

L1, 3SRU, 3UP5, S, L2

If now car B also arrives at the third floor, its car position relay B3UP will be energized. A circuit will be completed for energizing the operating winding of the selectivity relay BS in parallel circuit relation with that for energizing the operating winding of the selectivity relay S for car A. However, sufficient voltage is not available because of the voltage drop through the resistor 3SRU to effect the operation of the selectivity relay BS. As a result, its contact members BS1, Fig. 4, will be opened and all of the car selecting relays individual to car B will be deenergized, which would otherwise have been energized at this time. Therefore, as long as the two cars remain at the third floor, car A has assigned to it the zone away from this floor, while car B has no zone assigned to it.

*Stopping of car A at fourth floor in response to a car call*

It will be assumed that the operator wishes to stop the car at the fourth floor, for example, to permit a passenger to leave the car at this floor. He will, therefore, operate the car button 4N. Since the car button holding winding 4NC is energized, the car button 4N will remain in the operated position. As car A approaches the fourth floor, its car position relay 4UP will be energized, Fig. 4, by the brush *a* engaging the segment 4a. As a result, at this time a circuit is completed for energizing the operating winding of the stopping relay H, Fig. 2.

L1, 4N, W2, 4UP1, H, L2

In response to the operation of the stopping relay H, a sequence of operations will take place similar to those described hereinbefore for stopping the car at the third floor. Therefore, this sequence will not be repeated.

It is desirable to indicate at the fourth floor that car A, which is stopping at that floor, is operating on an up trip. Persons at the floor may then know the direction in which the car is moving, and it will be unnecessary for them to operate the hall call button at this floor if they wish to travel in the up direction. For this purpose, the hall lantern 4DL, Fig. 5, is lighted as soon as the car stops at the fourth floor in response to a car call.

L1, 4UL, 4DP7, 4UP7, M4, L2

As soon as the car leaves the fourth floor and contact members M4 are opened, the hall lantern 4DL is extinguished.

In the event that a call had previously been registered at the fourth floor for the down direction, then prior to the stopping of car A at the fourth floor in the up direction in response to a car call, the hall lantern 4DL would have been lighted.

L1, 4DL, 4UP6, 4DR4, L2

It is not desirable, however, to have both of the hall lanterns lighted at the same time. In order to prevent this occurrence, it will be observed that the hall lantern 4DL is energized through the closed contact members of the position relay 4UP when it is deenergized. When car A is at the fourth floor on an up trip, contact members 4UP6 of the up position relay 4UP will be opened, and thus, the hall lantern 4DL will be extinguished while the car is standing at the fourth floor. As soon, however, as the car leaves the fourth floor, the up position relay 4UP will be deenergized and the down hall lantern 4DL will again be illuminated.

*Car A reverses in shaft*

Under certain conditions, the operator may reverse the car in the shaft between the terminals. Such operation is not ordinarily contemplated and is not desired. However, it may be necessary to do this. In such case, the car reversing in the shaft will be considerably delayed in reaching the next terminal. Since no other car can receive a start signal until after the car which reverses in the shaft receives a start signal, and departs from a terminal in response thereto, the entire system may be affected if the car which reverses in the shaft is not removed from the dispatcher sequence temporarily.

In the event that car A is travelling upwardly in the shaft, up direction relay W, Fig. 2, will be energized. Down direction relay X will not be energized since contact members U6 and W1 will be open. However, on reversal of the car in the shaft, contact members D6 will be opened, due to the energization of the down reversing switch D in response to a corresponding operation of the master switch MS. Momentarily then, both of the direction relays W and X will be deenergized and, as a result, a circuit will be completed, Fig. 6, for energizing the operating winding of the car reversal relay T.

L1, W7, X7, K2, T, L2

As a result of the energization of the car reversal relay T, a circuit is completed for energizing the operating winding of the by-pass relay I.

L1, T1, I, L2

The auxiliary by-pass relay P is then energized.

L1, I5, K3, P, L2

Since the energization of the operating winding of the car reversal relay T is only momentary, contact members T1 are immediately opened and the operating winding of the by-pass relay I is deenergized. However, the auxiliary by-pass relay P locks up.

L1, P4, K3, P, L2

On the deenergization of the operating winding of the car reversal relay T, a circuit is completed for energizing the automatic by-pass relay Q.

L1, I4, P3, Q, L2

A further result of the energization of the car reversal relay T is to energize the dispatcher disconnecting relay Y.

L1, T2, K4, Y, L2

This relay locks up.

L1, Y1, K4, Y, L2

When a car reverses in the shaft, it is desirable that it not only lose its position in the dispatcher, so that the other cars may operate unaffected by the one car, but it is also desirable to transfer all of the calls previously registered on the car which reverses to the car having the next zone and to render the call storing relays of the car which reversed unaffected by subsequently operated hall call buttons for the direction in which the car is travelling until it arrives at the next terminal.

In response to the operation of the auxiliary by-pass relay P and the subsequent dropping out of the by-pass relay I, the circuit to the brushes $a$ and $b$, Fig. 4, is opened and, therefore, none of the car position relays for car A, for example, will be energized on movement of the car in the shaft. Since the automatic by-pass relay Q is energized, the zoning relay which was energized in accordance with the position of car A will be deenergized since contact members Q1 are now open. A further result of the energization of the automatic by-pass relay Q or the deenergization of the car position relays is to open the circuits for energizing the operating windings of the car selecting relays and they are deenergized.

Since the car position relays, the zoning relays and the car selecting relays which would otherwise be energized in accordance with the position of car A are not in the operated position because of its reversal in the shaft, car A loses its zone and calls previously registered on it, and calls later registered, will be ineffective to stop it.

Since car A is removed from the zoning system, the zone previously assigned to it will be assigned to the next car, for example, to car B. The corresponding car selecting relays for car B will then be operated and it will receive not only later registered calls in its zone, but also the calls previously registered on car A will be transferred to it.

Assuming that a call had been registered at the third floor for the up direction on the up call storing relay 3UR, Fig. 3, and that car A reverses in the shaft before it reached the third floor, then it is desirable that the call previously registered on the call storing relay 3UR be transferred to a call storing relay of another car, for example, car B. Since car A loses its zone as soon as it reverses in the shaft and its zone is transferred to another car, for example, car B, the car selecting relay 3UY for car B will be operated and a circuit will be completed for energizing the operating winding of the up call storing relay 3UR.

L1, P1 or I1, 3UR2, 3UY1, B3UY1, B3UR, 3RU, L2

A holding circuit is provided for the operating winding of the up call storing relay B3UR.

L1, BP1, B3UR2, B3UR, 3RU, L2

Since contact members P1 of the auxiliary by-pass relay P are opened and the contact members I1 of the by-pass relay I are also open, the holding circuit for the operating winding of the up call storing relay 3UR is opened, and it is deenergized. Momentarily, the up hall lantern 3UL, Fig. 5, will be lighted with the up hall lantern B3UL for car B. However, this transfer takes place rapidly and a person who has registered a call at the third floor for the up direction will immediately become aware that his call has been transferred from car A to car B.

Since the dispatcher disconnecting relay Y, Fig. 6, has been energized in response to the reversal of car A in the shaft and since it remains in the operated condition, it will, at contact members Y2, Fig. 8, open the energizing circuit for the dispatcher control relay ATE. At contact members ATE2, Fig. 7, a circuit will be completed for shunting the contact members AND5 of the next down relay AND and the contact members ASD2 of the start down relay ASD. As a result, the motor stopping relay TDH will not be deenergized when the start signal would otherwise be given to car A. In like manner, at contact members ATE3, a similar circuit will be completed for preventing the deenergization of the operating winding of the motor stopping relay TUH. Thus, the signal system for car A is removed from the dispatcher sequence by the reversal of this car in the shaft, and the dispatcher will operate to dispatch the remaining cars left in the sequence without regard to car A.

It is desirable to restore car A which has been taken out of the dispatcher sequence, to the dispatcher sequence as soon as it arrives at the next terminal. For this purpose, the releasing relay K, Fig. 6, is provided, which will be energized on the arrival of the car at either terminal, for example, at the top terminal.

L1, 40t LM5, K, L2

At contact members K3, the holding circuit for the operating winding of the auxiliary by-pass relay P is opened. At contact members K4, the holding circuit for the operating winding of the dispatcher disconnecting relay Y is opened. These relays then drop out. Since contact members P3 are opened in response to the dropping out of the auxiliary by-pass relay P, the circuit for maintaining the operating winding of the automatic by-pass relay Q will be opened and it will be deenergized. The signal system for car A will then be automatically restored to the control of the dispatcher sequence, and at the next interval when the next down or up signal and start down or up signal should be given to car A, it will receive it.

*Next signal given to car A before arriving at a terminal*

In order to operate the cars from the terminals on a predetermined schedule, it is desirable that a car be at a terminal when the next signal is given to it. In the event that a next signal is given to a car as it is approaching a terminal it is, therefore, desirable to permit the car to reach the terminal without delay. In order to expedite the arrival of a car at a terminal after it receives a next signal, the calls which are later registered and which would otherwise be effective to stop it are ineffective to do so, and are assigned to the car having the next zone. As soon as a car receives a next signal while it is approaching a terminal, it immediately loses its zone and the floors which were previously assigned to it are assigned to the car having the next succeeding zone. In this manner, calls later registered and which would otherwise be effective to stop the car which has received the next signal, will be registered on the call storing relays for the car having the next zone which includes the zone previously assigned to the car which receives the next signal.

Assuming that car A is travelling upwardly in the shaft and that it receives a next signal indicating that it is the next car to leave the top terminal, then its automatic by-passing relay Q, Fig. 6, will be operated.

L1, AND2, W6, Q, L2

It will be recalled in the operation of the dispatcher that the next down relay AND will be operated in order to give the next down signal to car A.

As a result of the operation of the automatic by-passing relay Q, it loses its zone since contact members Q1, Fig. 4, are opened. In addition, at contact members Q2 the energizing circuits for the operating windings of the car selecting relays individual to car A are opened. It is, therefore, not possible for later registered calls to be effective to operate the call storing relays for car A. However, since the energizing circuits for the car position relays for car A remain intact, the calls previously registered on car A will be effective to stop it. That is, the call storing relays for car A previously operated in response to registered hall calls will remain in the operated condition and will be effective to stop car A in response thereto. However, since none of the zoning relays will be operated in accordance with the position of car A, the zone previously assigned to it will be assigned to the next car, for example, car B, and calls later registered will be assigned to it.

*By-pass switch of car A is operated*

In some instances, it may be desirable to prevent one of the cars, car A for example, from stopping at other floors before it arrives at a terminal. In the event that the car is fully loaded, it would be useless for it to stop at floors where calls have been registered, since no additional passengers could be carried by the car. In order to take care of this condition, the manual by-pass switch MBP, Fig. 6, is provided. In response to the momentary operation of the manual by-pass switch MBP, the by-pass relay I is energized.

L1, MBP, I, L2

A sequence of operations then takes place, identical with that previously described, which took place in response to the energization of the car reversal relay T, except that the operating winding of the dispatcher disconnecting relay Y is not energized. That is, the auxiliary by-pass relay P is energized and locks up. The by-pass relay I drops out and the automatic by-passing relay Q is operated. Car A then loses its zone, which is transferred to the next car. Calls previously registered for car A will be transferred to the car which assumes its zone and corresponding indications on the hall lanterns will be made. Later registered calls which would otherwise be effective to stop car A are ineffective to do so.

As soon as car A arrives at the next terminal its releasing relay K will be operated to open the holding circuit for the auxiliary by-pass relay P, which in turn, opens the energizing circuit for the operating winding of the automatic by-passing relay Q.

*Maintenance switch of car A is operated*

In order to permanently take a car out of service, as contrasted with temporarily taking it out of service in response either to its reversal in the shaft or the operation of the by-pass relay, the maintenance switch MTS, Fig. 6, is provided. In response to the operation of this switch, the maintenance relay LM is operated.

L1, MTS, LM, L2

The by-pass relay I is energized as soon as car A is stopped at a floor.

L1, LM3, M5, I, L2

The operating winding of the auxiliary by-pass relay P is energized.

L1, I5, LM4, P, L2

The operating winding of the dispatcher disconnecting relay Y is also energized.

L1, LM6, Y, L2

Since the maintenance relay LM remains in the operated condition as long as the maintenance relay MTS is operated, it will be understood that the auxiliary by-pass relay P and the dispatcher disconnecting relay Y will remain in the operated condition. Therefore, until the maintenance switch MTS is operated to deenergize the operating winding of the maintenance relay LM, the signalling system for car A will be permanently taken out of the dispatcher sequence. Since contact members LM5 are opened under these conditions, the releasing relay K will not be operated to automatically restore the signalling system to the control of the dispatcher when the car arrives at either terminal. It will be understood, however, that when the maintenance switch MTS is operated to deenergize the operating winding of the maintenance relay LM, a circuit will be prepared for energizing the operating winding of the releasing relay K at contact members LM5, so that on operation of the car to a terminal, its signalling system will automatically be restored to the dispatcher sequence.

As soon as the car leaves a floor after the maintenance switch MTS is operated, the by-pass relay I is restored to the non-operated condition and the previously traced circuit is completed for energizing the operating winding of the automatic by-passing relay Q. The previously described sequence then takes place which is identical with that described in connection with the operation of the car reversal relay T. Car A loses its zone and it is transferred to the next car. Also, calls previously registered for car A will be transferred to the next car which assumed its zone and later registered calls which would otherwise be effective to stop car A will be ineffective to do so.

A further result of the operation of the maintenance relay LM is to close contact members LM1 and LM2, Fig. 2, so that car A may be started from either terminal without awaiting the start signal which would otherwise be necessary to complete the energizing circuits for the up and down reversing switches U and D.

It will be apparent that certain modifications may be made in the foregoing system without departing from the scope and spirit thereof. Therefore, it is intended that all matter shown in the accompanying drawings or set forth in the foregoing description shall be interpreted as illustrative and not in a limiting sense.

We claim as our invention:

1. In a system for operating a plurality of elevator cars between top and bottom terminals past a plurality of floors, in combination, control means for each of said floors, means responsive to the operation of a control means at a floor for immediately assigning a stop call for the corresponding floor to a selected one of said cars, dispatching means for providing signals to control the departure of said cars from one of said terminals, and means responsive to operation of said dispatching means in providing a predetermined signal to one of said cars for thereafter preventing the assignment of stop calls to the signalled one of said cars.

2. In a system for operating a plurality of elevator cars between top and bottom terminals past a plurality of floors, in combination, control means for each of said floors, means responsive to the operation of a control means at a floor for immediately assigning a stop call for the corresponding floor to a selected one of said cars, dispatching means for providing signals to control the departure of said cars from one of said terminals, and means responsive to operation of said dispatching means in providing a predetermined signal to one of said cars for preventing the assignment of stop calls to the signalled one of said cars for a plurality of floors in advance of the signalled car in its direction of motion.

3. In a system for operating a plurality of elevator cars between top and bottom terminals past a plurality of floors, in combination, control means for each of said floors, means responsive to the operation of a control means at a floor for immediately assigning a stop call for the corresponding floor to a selected one of said cars, dispatching means for providing signals to control the departure of said cars from one of said terminals, and means responsive to operation of said dispatching means in providing a predetermined signal to one of said cars for preventing the assignment of stop calls to the signalled car for certain of said floors.

4. In a system for operating a plurality of elevator cars between top and bottom terminals past a plurality of floors, in combination, call registering means for each floor, a call registering relay individual to each car and each floor effective, when prepared, to respond to the operation of said call registering means, a car selecting relay individual to each car and each floor for preparing said call registering relays to be responsive to the operation of said call registering means, dispatching means disposed to provide signals at predetermined intervals to indicate the next car to leave a terminal, and by-pass relay means responsive to operation of said dispatching means in giving a next signal to a car for preventing further operation of said car selecting relays to prepare the call registering relays of the signalled car to be responsive to subsequent registration of calls.

5. In a system for operating a plurality of elevator cars between top and bottom terminals past a plurality of floors, in combination, call storing means individual to each car and each floor, zoning means controlled jointly by the positions of said cars for defining zones of floors for each of said cars, control means individual to each floor for operating the call storing means of each car corresponding to floors in the zone of the associated car, dispatching means disposed to provide a signal indicating when a car should leave a terminal, and means for rendering any of said control means operated after said dispatching means has given a signal to a car ineffective to operate other call storing means individual to the signalled car.

6. In a system for operating a plurality of elevator cars from a terminal past a plurality of floors, in combination, control means individual to each car for stopping the associated car at said floors, zoning means controlled by the positions of said cars for defining zones of floors for each of said cars, call registering means individual to each floor for operating said control means of each car corresponding to floors in the zone of the corresponding car, dispatching means for individually selecting said cars for departure from said terminal and for providing signals directive of such departure, individual by-pass means for each of said cars, each of said by-pass means being selectively operable to prevent operation of said control means for the corresponding individual car in response to subsequent operation of said call registering means, and means effective to individually operate any of said by-pass means when the associated individual car is approaching said terminal and has been selected for departure therefrom by said dispatching means.

7. In a system for operating a plurality of elevator cars between top and bottom terminals past a plurality of floors, in combination, call storing means individual to each car and each floor, zoning means controlled jointly by the positions of said cars for defining zones of floors for each of said cars, call registering means individual to each floor for operating the call storing means of each car corresponding to floors in the zone of the associated car, dispatching means for individually selecting cars for departure from said terminals and for providing signals directive of such departure, individual means for each car operable to prevent operation of any of said call storing means for the corresponding car in response to subsequent operation of any of said call registering means, means effective to separately operate any of said individual means when the corresponding car is approaching one of said terminals and has been selected for departure therefrom by said dispatching means, and means effective upon operation of any of said individual means for transferring the zone previously individual to the corresponding car to another of said cars.

8. In a system for operating a plurality of elevator cars between top and bottom terminals past a plurality of floors, in combination, control means individual to each car for stopping it at said floors, zoning means controlled jointly by the positions of said cars for defining zones of floors for each of said cars, call registering means individual to each floor for operating said control means of each car corresponding to floors in the zone of the associated car, dispatching means for individually selecting said cars for departure from said terminals and for providing signals directive of such departure, individual by-pass means for each of said cars, each of said by-pass means being selectively operable to prevent operation of said control means for the corresponding individual car in response to subsequent operation of said call registering means, means for individually operating any of said by-pass means when the associated individual car is approaching one of said terminals and has been selected for departure therefrom by said dispatching means, and means effective upon operation of any of said by-pass means for transferring the zone previously individual to the corresponding car to another of said cars.

9. In a system for operating a plurality of elevator cars from a terminal past a plurality of floors, in combination, control means individual to each car for stopping the corresponding car at said floors, zoning means controlled jointly by the positions of said cars for defining zones of floors for each of said cars, call registering means individual to each floor for operating said control means of each car corresponding to floors in the zone of the associated car, dispatching means for individually selecting said cars for departure from said terminal and for providing signals directive of such departure, and means responsive to operation of said dispatching means in selecting any predetermined one of said cars for departure from said terminal for assigning a zone to said predetermined one of said cars so selected.

10. In a system for operating a plurality of elevator cars between top and bottom terminals past a plurality of floors, in combination, call registering means for each floor, a call registering relay individual to each car and each floor effective, when prepared, to respond to the operation of said call registering means for the corresponding floor, a car selecting relay individual to each call registering relay for preparing a plurality of said call registering relays to be responsive to the operation of said call registering means, dispatching means for signalling when a car should leave a terminal, and means operated by said dispatching means on signalling a car for operating the car selecting relays individual thereto.

11. In a system for operating a plurality of elevator cars between top and bottom terminals past a plurality of floors, in combination, control means individual to each car for stopping it at said floors, zoning means controlled jointly by the positions of said cars for defining zones of floors for each of said cars, call registering means individual to each floor for operating said control means of each car corresponding to floors in the zone of the associated car, dispatching means disposed to provide signals at predetermined intervals to indicate the next car to leave a terminal, and means responsive to operation of said dispatching means in giving a next signal to one of said cars for assigning a zone to said one of said cars.

12. In a system for operating a plurality of elevator cars between top and bottom terminals past a plurality of floors, in combination, call storing means individual to each car and each floor, zoning means controlled jointly by the positions of said cars for defining zones of floors for each of said cars, control means individual to each floor for operating the call storing means of each car corresponding to floors in the zone of the associated car, a dispatch signal system for each of said cars, dispatching means disposed to sequentially operate said signal systems to provide signals to said cars to indicate when they should leave said terminals, means for removing said signal system of any of said cars from service, and means for transferring the zone assigned to a car on removal of its signal system from service to another of said cars.

13. In a system for operating a plurality of elevator cars between top and bottom terminals past a plurality of floors, in combination, call storing means individual to each car and each floor, call registering means individual to each floor for operating said call storing means, a dispatch signalling system for each of said cars, dispatching means for controlling said signalling systems to provide signals to said cars to leave said terminals in a predetermined sequence, means for removing the signalling system of any of said cars from service, and means controlled by said dispatching means for preventing the call storing means individual to a car having the signalling system thereof removed from service from responding to the operation of said call registering means.

14. In a system for operating a plurality of elevator cars between top and bottom terminals past a plurality of floors, in combination, call storing means individual to each car and each floor, zoning means controlled jointly by the positions of said cars for defining zones of floors for each of said cars, control means individual to each floor for operating the call storing means of each car corresponding to floors in the zone of the associated car, a dispatch signal system for each of said cars, dispatching means disposed to sequentially operate said signal systems to provide signals to said cars to indicate when they should leave said terminals, means for removing the signal system of any of said cars from service, means for transferring the zone assigned to a car on removal of its signal system from service to another of said cars, and means for restoring the removed signal system to service on the arrival of the car individual thereto at a terminal.

15. In a system for operating a plurality of elevator cars between top and bottom terminals past a plurality of floors, in combination, call storing means individual to each car and each floor, call registering means individual to each floor for operating said call storing means, a dispatch signalling system for each of said cars, dispatching means for controlling said signalling systems to provide signals to said cars to leave said terminals in a predetermined sequence, means for removing the signalling system of any of said cars from service, means for preventing the call storing means individual to a car having the signalling system thereof removed from service from responding to the operation of said call registering means, and means automatically effective to restore the removed signalling system to service on the arrival of the car individual thereto at a terminal.

16. In a system for operating a plurality of elevator cars between top and bottom terminals past a plurality of floors, in combination, a call registering relay individual to each car and each floor, zoning means controlled jointly by the positions of said cars for defining zones of floors for each of said cars, call registering means individual to each floor for operating the call registering relays of each car corresponding to floors in the zone of the associated car, a dispatch signalling system for each of said cars, dispatching means disposed to control said signalling systems to sequentially indicate to said cars when they are next to start from said terminals, means for removing the signalling system of any of said cars from service, means for transferring the zone assigned to a car on removal of its signal system from service to another of said cars, and means for restoring the removed signalling system to service on the arrival of the car individual thereto at a terminal.

17. In a system for operating a plurality of elevator cars between top and bottom terminals past a plurality of floors, direction preference means for each of said cars, each of said direction preference means being effective upon stopping of the corresponding car at any of said floors for preparing for departure of said corresponding car in the direction of arrival thereof to thereby maintain continuous trip direction for said corresponding car, terminal reversing means for each of said cars, each of said terminal reversing means being effective upon arrival of the associated car at one of said terminals for controlling the corresponding direction preference means to prepare for departure of said associated car in the reverse direction to that of arrival, a dispatch signalling system for each of said cars, dispatching means for controlling said signalling systems to indicate the time and sequence in which said cars should leave said terminals, manual means operable to control said direction preference means to reverse the trip direction of any of said cars between said terminals, and means responsive to every operation of said manual reversing means in reversing the trip direction of any selected car between said terminals, for removing the signalling system of said selected car from the sequence established by said dispatching means.

18. In a system for operating a plurality of elevator cars between top and bottom terminals past a plurality of floors, in combination, master control means for controlling the direction of operation of said cars, a dispatch signalling system for each of said cars, dispatching means for controlling said signalling systems to indicate the time and sequence in which said cars should leave a terminal, means operable on reversal of a car between said terminals in response to the operation of said master control means for removing the signalling system of the reversed car from the dispatcher sequence, and means for restoring the signalling system of the reversed car in the dispatcher sequence on arrival of said reversed car at a terminal.

19. In a system for operating a plurality of elevator cars between top and bottom terminals past a plurality of floors, in combination, master control means individual to each car for controlling the direction of movement thereof, a dispatch signalling system for each of said cars, dispatching means disposed to operate said signalling systems to sequentially indicate when said cars should leave a terminal, means operable on reversal of a car between said terminals in response to the operation of the master control means individual thereto for removing the signalling system of said car from the dispatcher sequence, means for adjusting the sequence of said dispatching means to substantially uniformly space apart the dispatching signals to the remaining cars in the sequence, and means for restoring a removed signalling system in the dispatcher sequence on arrival of the corresponding car at a terminal.

20. In a system for operating a plurality of elevator cars between top and bottom terminals past a plurality of floors, in combination, call registering means individual to each floor, signalling means individual to each car and each floor for indicating the car to which a call is assigned as soon as it is registered, and dispatching means for controlling the assignment of calls to said cars and for signalling to said cars when they should leave a terminal.

21. In a system for operating a plurality of elevator cars between top and bottom terminals past a plurality of floors, in combination, call registering means for each floor, call storing means operable in response to the registration of a call for stopping one of said cars, signalling means for each floor operable in response to the operation of a call storing means for indicating the car which will stop at the floor where a call is registered, and dispatching means disposed to control the assignment of calls to said cars and to provide signals to said cars at predetermined intervals and in a predetermined sequence to indicate when said cars should leave a terminal.

22. In a system for operating a plurality of elevator cars from a terminal past a plurality of floors, in combination, call registering means for each of said floors, selecting and controlling means responsive to operation of any of said call registering means for selecting one of said cars and for causing the selected car to stop at the floor corresponding to the operated call registering means, signalling means individual to each car and each floor for indicating immediately upon operation of any of said call registering means the one of said cars which will stop in response to such operation, dispatching means for individually selecting said cars for departure from said terminal and for providing signals directive of such departure, individual by-pass means for each of said cars, each of said by-pass means being selectively operable to prevent operation of said selecting and controlling means to select and stop the corresponding individual car in response to subsequent operation of said call registering means, and means effective to individually operate any of said by-pass means when the associated individual car is approaching said terminal and has been selected for departure therefrom by said dispatching means.

23. In a system for operating a plurality of elevator cars between top and bottom terminals past a plurality of floors, in combination, call storing means individual to each car and each floor, zoning means controlled jointly by the positions of said cars for defining zones of floors for each of said cars, call registering means individual to each floor for operating said call storing means of each car corresponding to floors in the zone of the associated car, signalling means individual to each car and each floor responsive to the operation of said call storing means for indicating as soon as a call is registered the car which will answer the registered call, dispatching means for individually selecting said cars for departure from said terminal and for providing signals directive of such departure, and means responsive to operation of said dispatching means in selecting any predetermined one of said cars for departure from said terminal for assigning a zone to said predetermined one of said cars so selected.

24. In a system for operating a plurality of elevator cars between top and bottom terminals past a plurality of floors, in combination, call storing means individual to each car and each floor for stopping said cars at said floors, zoning means controlled jointly by the positions of said cars for defining zones of floors for each of said cars, call registering means individual to each floor for operating said call storing means of each car corresponding to floors in the zone of the associated car, a hall lantern individual to each car and each floor and disposed to be energized on operation of the call storing means individual thereto for immediately indicating the car which will stop at a floor in response to the registration of a call at said floor, and dispatching means for indicating the time and sequence in which said cars should leave a terminal and for controlling the assignment of zones to said cars.

25. In a system for operating a plurality of elevator cars between top and bottom terminals past a plurality of floors, in combination, call storing means individual to each car and each floor for stopping said cars at said floors, zoning means controlled jointly by the positions of said cars for defining zones of floors for each of said cars, call registering means individual to each floor for operating said call storing means of each car corresponding to floors in the zone of the associated car, a hall lantern individual to each car and each floor and disposed to be energized on operation of the call storing means individual thereto for immediately indicating the car which will stop at a floor in response to the registration of a call at said floor, dispatching means for individually selecting said cars for departure from said terminals and for providing signals directive of such departure, individual means for each car operable to prevent operation of any of said call storing means individual to the corresponding car in response to subsequent operation of any of said call registering means, and means effective to separately operate any of said individual means when the corresponding car is approaching one of said terminals and has been selected for departure therefrom by said dispatching means.

HAROLD W. WILLIAMS.
RICHARD W. JONES.